(12) United States Patent
Ramamurthy et al.

(10) Patent No.: US 6,304,551 B1
(45) Date of Patent: Oct. 16, 2001

(54) REAL-TIME ESTIMATION AND DYNAMIC RENEGOTIATION OF UPC VALUES FOR ARBITRARY TRAFFIC SOURCES IN ATM NETWORKS

(75) Inventors: Gopalakrishnan Ramamurthy, Cranbury; Brian Lai-Bue Mark, Princeton, both of NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 08/821,864

(22) Filed: Mar. 21, 1997

(51) Int. Cl.$^7$ ............................... H04J 1/16; H04L 12/28
(52) U.S. Cl. ........................................ 370/232; 370/252
(58) Field of Search ..................................... 370/229, 230, 370/231, 232, 233, 234, 238, 236, 252, 253, 395, 468

(56) References Cited

U.S. PATENT DOCUMENTS

| | | | |
|---|---|---|---|
| 5,448,567 | * 9/1995 | Dighe et al. | 370/233 |
| 5,524,006 | * 6/1996 | Hluchyj et al. | 370/231 |
| 5,530,695 | * 6/1996 | Dighe et al. | 370/232 |
| 5,559,798 | * 9/1996 | Clarkson et al. | 370/232 |
| 5,629,937 | * 5/1997 | Hayter et al. | 370/233 |
| 5,636,212 | * 6/1997 | Ikeda | 370/233 |

\* cited by examiner

*Primary Examiner*—Melvin Marcelo
*Assistant Examiner*—Chiho Andrew Lee
(74) *Attorney, Agent, or Firm*—Sughrue, Mion, Zinn, Macpeak & Seas, PLLC

(57) ABSTRACT

A scheme for determining the usage parameter control (UPC) values for an arbitrary traffic source from observations of its emitted cell stream is disclosed. The UPC values are used in a traffic shaping mechanism based on a dual leaky bucket, which shapes the cell stream by either discarding or delaying cells. The choice of UPC values is a function of the statistical characteristics of the observed cell stream; the user's tolerance for delay prior to the network access point; and the cost incurred on the network side. The chosen UPC values are then negotiated with the network. The source traffic characteristics may change dramatically over time, making the initially negotiated UPC descriptor inappropriate for the entire traffic stream. Hence, a method is disclosed for dynamically renegotiating UPC parameters whenever a predetermined change in traffic characteristics is detected. This method for real-time estimation and dynamic renegotiation of UPC parameters is the basis for a self-contained module which allows the source to make efficient use of the network resources.

20 Claims, 12 Drawing Sheets

E (D) = 5 ms: mobi, ns (60s)

Cost Function

------- k = 1
----- k = 10
——— k = 50
——— k = 100 b(μ) curve window
— 600 s
—·— 60 s
······ 5 s
— 2 s

E(D) = 5 ms

Prob. Delay Bound

Cost Function

Peak, Sustainable, Mean Rates

Bucket Size

Negotiated Peak, Sustainable Rates

Negotiated Bucket Size

REAL-TIME ESTIMATION AND DYNAMIC RENEGOTIATION OF UPC VALUES FOR ARBITRARY TRAFFIC SOURCES IN ATM NETWORKS

BACKGROUND OF THE INVENTION

1. Field of the Invention

The present invention is directed to a device and method for real-time estimation and dynamic renegotiation of usage parameter control (UPC) parameters for arbitrary traffic sources in asynchronous transfer mode (ATM) networks, and more particularly, to a device and method for dynamically renegotiating UPC parameters whenever a predetermined change in traffic characteristics is detected.

2. Discussion of the Prior Art

In networks based on asynchronous transfer mode (ATM), traffic sources are subjected to a usage parameter control (UPC) function which employs a deterministic algorithm to control or shape a cell stream emitted from a source. In a UPC-based traffic control framework, the UPC parameters constitute a traffic descriptor used to allocate network resources to the traffic source.

BACKGROUND OF INVENTION

One key feature of ATM networks is their potential for efficiently supporting variable bit rate (VBR) traffic sources, such as video. Applications such as video have stringent requirements on the guarantee of the quality-of-service (QoS) provided by the network. An ATM network, however, can guarantee QoS only if it has a reasonably good description of the characteristics of the offered traffic. Hence, a traffic descriptor that describes the characteristics of the offered traffic, and a policing mechanism that ensures conformance with the declared traffic parameters, are essential.

A single leaky bucket has been studied extensively as a means of open-loop control of a traffic stream at the network edge. Since a constant bit rate (CBR) traffic or data stream has a well-defined rate, the single leaky bucket provides an adequate description of the stream. However, for variable bit rate (VBR) streams, peak rate allocation via a single leaky bucket is wasteful of network resources. Hence, a dual leaky bucket mechanism has been proposed for policing and characterizing the more general VBR source.

It is recognized that VBR streams such as video may be transmitted over an ATM network as a CBR stream. However, video sources naturally produce variable bit rate streams. Transmitting video as a CBR stream may result in variable quality and/or lower network utilization. This is because the statistical multiplexing feature of ATM is not exploited in this case.

The dual leaky bucket UPC offers a better means of characterizing VBR traffic, but introduces the problem of selecting the appropriate parameter values for a given stream. This problem has been recognized as important for providing efficient VBR service in ATM networks.

Despite the recognition of this important problem, to date, most of the methods devised for selecting UPC parameters have been ad-hoc, without having a sound theoretical basis. Some approaches have assumed specific models for the user traffic, namely the on-off Markov fluid model, in order to obtain UPC values. This approach, however, is not robust for traffic streams that behave much differently from the on-off model. Accordingly, there is a need to characterize efficiently an arbitrary ATM traffic stream and select optimal dual leaky bucket UPC values with respect to minimizing network resource requirement and subject to QoS constraints for an arbitrary traffic source.

SUMMARY OF THE INVENTION

The object of the present invention is to provide a device and a method for real-time characterization of an arbitrary asynchronous transfer mode (ATM) data traffic that eliminates the problems of conventional data traffic control methods.

The present invention relates to a method of characterizing, in real-time, an asynchronous transfer mode (ATM) traffic stream by a set of usage parameter control (UPC) values to be negotiated with a network provider for the purposes of resource allocation and traffic policing with respect to the said traffic stream. Moreover, the invention provides a method for detecting predetermined changes in the relevant statistical characteristics of the traffic stream and subsequently, dynamically renegotiating the UPC values with the network. The invention is an important component in a UPC-based traffic control framework for ensuring quality-of-service (QoS) while maintaining high network resource efficiency.

The UPC traffic descriptor based on the dual leaky bucket algorithm provides a mechanism to describe the offered traffic. The dual leaky bucket UPC is implemented by a deterministic algorithm which maps an input arrival process to an output arrival process that conforms to the characteristics specified in four parameters. In the UPC-based approach to traffic control, the UPC values for a source are taken as a traffic descriptor to be used by a connection admission control (CAC) function for making admission decisions.

The four-parameter dual leaky bucket provides control for two rates: the peak rate and sustainable rate with burst tolerances on both rates. By contrast, the two-parameter single leaky bucket controls only the peak rate (with burst tolerance) of a stream. While the single leaky bucket is suitable for controlling constant bit rate (CBR) traffic, it does not provide an efficient means of controlling VBR traffic, which behaves as a random traffic source. Characterizing a VBR stream by its peak rate could result in very poor network resource utilization.

The present invention includes a method for statistically characterizing an arbitrary traffic stream together with a method of mapping the characterization to dual leaky bucket parameters. Furthermore, the present invention provides a means of detecting when UPC values should be renegotiated with respect to source QoS constraints.

The present invention provides a method for determining, in real-time, optimal dual leaky bucket UPC values for an arbitrary ATM traffic stream. The UPC values selected by the inventive method are optimal in the sense of minimizing the network resource requirement implied by UPC values, taking into account the statistical properties of the traffic stream and the QoS constraints of the source. Further, the invention adapts to significant changes, in traffic characteristics by dynamically renegotiating UPC values with the network.

One embodiment of the present invention includes a method of characterizing an arbitrary asynchronous transfer mode traffic stream in real-time comprising the steps of:

characterizing the traffic stream statistically over an observation interval T;

mapping the statistically characterized traffic stream to usage parameter control (UPC) values of a dual leaky bucket which minimize a cost function subject to predetermined constraints of a user, the dual leaky bucket including a peak rate leaky bucket and a sustainable rate leaky bucket, and the UPC values including a peak rate $\lambda_p$, a sustainable rate $\lambda_s$, and a sustainable bucket size $B_s$;

detecting a predetermined change in the traffic stream; and renegotiating the UPC values with a network when the predetermined change is detected.

Another embodiment includes a device for managing an arbitrary asynchronous transfer mode (ATM) cell stream from a source comprising:

a usage parameter control selector which characterizes the cell stream statistically over an observation interval T and maps the statistical characterization to dual leaky bucket usage parameter control (UPC) values once every observation interval T, in response to observations of the cell stream and source shaping constraints received from the source; and a usage parameter control shaper that shapes, in accordance with the UPC values, the cell stream received from the source and outputs shaped stream data.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

1: Problem Formulation

The present invention focuses on the problem of determining dual leaky bucket UPC values to characterize a traffic stream. The UPC values are to be used by the CAC function for connection admission and resource allocation decisions. The invention addresses the following fundamental question: Given a cell stream from an arbitrary traffic source, how should the values of the UPC parameters be chosen? The solution should depend on the characteristics of the cell stream, the user's tolerance for traffic shaping and the CAC function. Furthermore, the solution should be able to adapt to changes in the source traffic characteristics.

An asynchronous transfer mode (ATM) network will be able to guarantee quality-of-service (QoS) in an efficient manner only if it has a reasonably good characterization of the offered traffic. Hence, traffic descriptors which characterize the offered traffic and policing mechanisms that ensure conformance with the traffic parameters are essential. A dual leaky bucket UPC algorithm proposed by a group of skilled in the art, referred to as the ATM Forum, serves as a policing mechanism. The four parameters associated with the dual leaky bucket constitute a traffic descriptor used in the UPC-based framework for admission control.

Operation of the dual leaky bucket mechanism is as follows. The dual leaky bucket mechanism can be viewed as a serial cascade of two single leaky buckets. A single leaky bucket is parameterized by a leak rate $\mu$ and a bucket size B. As a traffic policing mechanism, the leaky bucket can be understood as a G/D/1/B queue with constant service rate $\mu$ and storage capacity B (including the customer in service).

Figure 1:
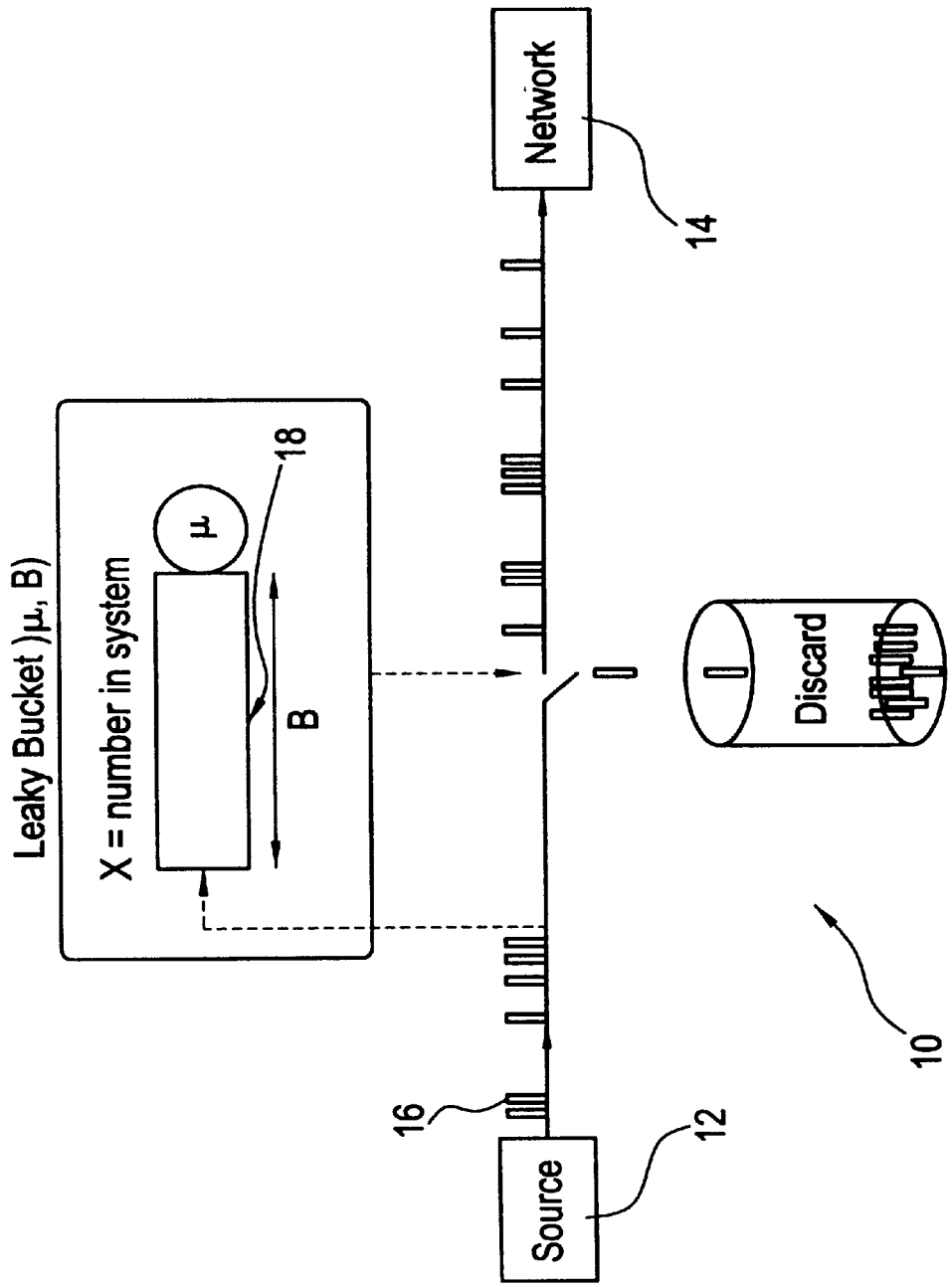
FIG. 1 shows a G/D/1/B queue model of a conventional single leaky bucket acting as a traffic policing mechanism with cell discard.

FIG. 1 shows a G/D/1/B queue model of a conventional single leaky bucket 10 which acts as a traffic policing mechanism with cell discard and is located between a source 12 and a network 14. In FIG. 1, each cell 16 generates a fictitious customer arrival to a G/D/1/B queue 18. As shown in FIG. 1, each cell arrival generate a corresponding fictitious customer arrival to the queue served at constant rate $\mu$ with a waiting room of size B. A state counter X corresponds to the number of customers in the queue (including the cell in service).

If a cell arrives when the queue is not full, it is deemed conforming to the UPC parameters ($\mu$,B) and is sent out immediately. Otherwise, if the cell arrives when the queue is full, it is deemed non-conforming and is discarded. In this manner, the operation of the leaky bucket 10 with an arbitrary cell stream as input, is modeled by a G/D/1/B queue.

Figure 2:
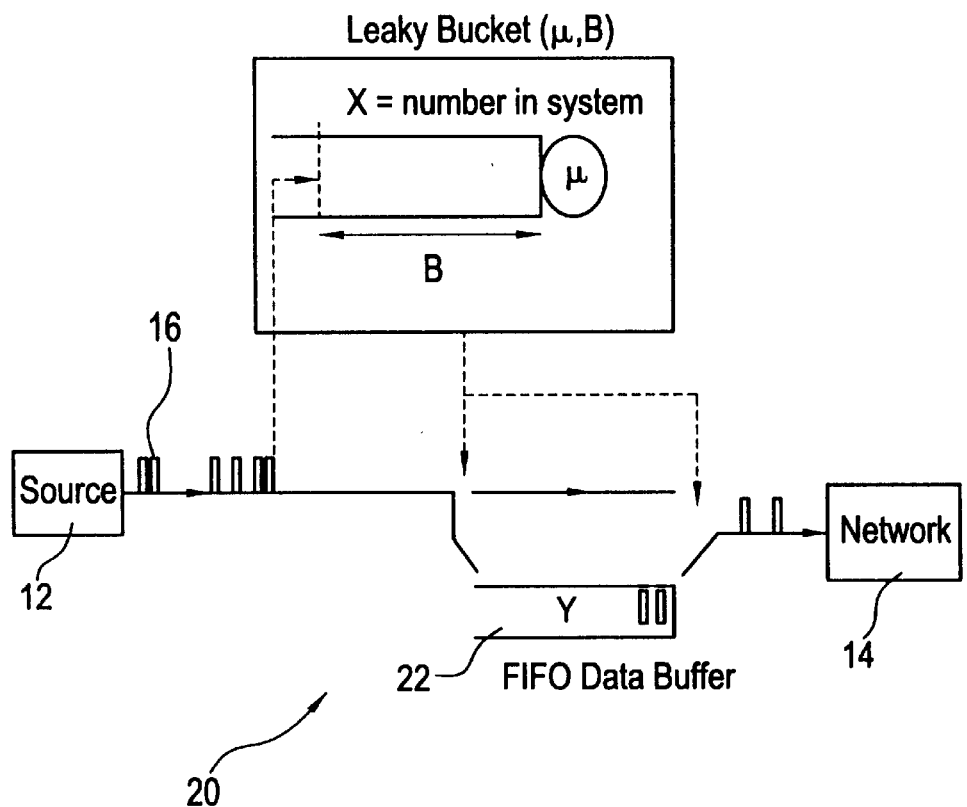
FIG. 2 shows a G/D/1 queue model of a conventional single leaky bucket acting as a data traffic shaper.

Instead of discarding non-conforming cells, where the leaky bucket is used as a traffic policing mechanism based on the G/D/1/B queue, as shown in FIG. 1, the leaky bucket can be used as a traffic shaping mechanism based on a G/D/1 queuing model. FIG. 2 shows a leaky bucket 20 is used as a traffic shaping mechanism based on a G/D/1 queuing model. If a cell 16 arrives and the number of customers X in the queue is less than the bucket size B, the cell 16 is sent out immediately. Otherwise, if the cell 16 arrives when $X \geq B$, then this cell is stored in a data buffer 22 which reads out cells at the constant rate $\mu$. Thus, any cell arriving when $X \geq B$ will be delayed.

Figure 3:
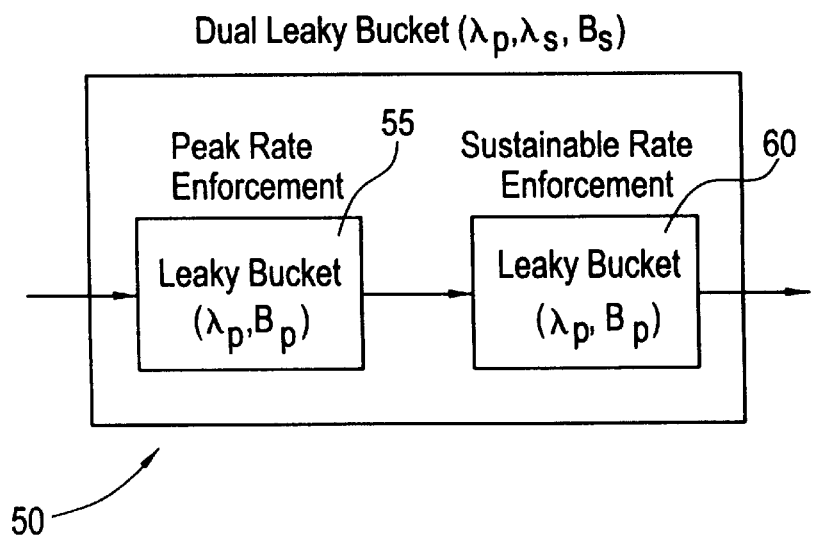
FIG. 3 shows a model of a conventional dual leaky bucket implemented as a cascade of two single leaky buckets: a peak rate leaky bucket and a sustainable rate leaky bucket.

Instead of a single leaky bucket, a dual leaky bucket is used as a shaping or policing mechanism. FIG. 3 shows a dual leaky bucket queuing model 50 shaper (or policer). The dual leaky bucket 50 is viewed as two single leaky buckets connected in series or in cascade; a peak rate leaky bucket 55 with parameters $(\lambda_p, B_p)$, and a sustainable rate leaky bucket 60 with parameters $(\lambda_s, B_s)$, where $\lambda_p > \lambda_s$. $\lambda_p$ and $\lambda_s$ are peak and sustainable rates of cell transfer, respectively; and $B_p$ and $B_s$ are peak and sustainable bucket sizes, respectively.

It is assumed that $B_p=1$ so that the inter-cell spacing of conforming cell streams is constrained to be at most $1/\lambda_p$. Note, values of $B_p>1$ allow for cell delay variation (CDV) at the customer premises. The set of three parameters $(\lambda_p, \lambda_s, B_s)$ form a traffic descriptor which is negotiated in a service contract between the user or source and the network.

According to the present invention, a method of characterizing an arbitrary traffic stream, such as an asynchronous transfer mode (ATM) traffic stream, by an optimal set of dual leaky bucket usage parameter control (UPC) values in real-time comprises the following steps:

(a) characterizing the traffic stream statistically over an observation interval T;

(b) mapping the statistically characterized traffic stream, generated by step (a), to usage parameter control (UPC) values of a dual leaky bucket which minimize a cost function subject to predetermined constraints of a user, such as quality-of-service (QoS) constraints, the dual leaky bucket including a peak rate leaky bucket and a sustainable rate leaky bucket, and the UPC values including a peak rate $\lambda_p$, a sustainable rate $\lambda_s$, and a sustainable bucket size $B_s$;

(c) detecting a predetermined change in the traffic stream; and (d) renegotiating UPC values with the network 14 when the predetermined change is detected.

For example, the predetermined change is a change which is larger than a threshold.

2: Method for Traffic Characterization

The traffic characterization is designed to allow mapping to dual leaky bucket UPC parameters. To motivate the statistical traffic characterization, a deterministic traffic characterization based on the leaky bucket is described. A three-parameter descriptor $(\lambda_p, \lambda_s, B_s)$ represents a class of cell streams which conform to the dual leaky bucket with these parameters. $\lambda_p$ and $\lambda_s$ are peak and sustainable rate of cell stream transfer, and $B_s$ is the sustainable bucket size.

For a given cell stream, the three parameters $(\lambda_p, \lambda_s, B_s)$ give operationally verifiable bounds on the behavior of the cell stream. If the stream conforms to $(\lambda'_p, \lambda'_s, B'_s)$, where $$\lambda'_p \leq \lambda_p, \lambda'_s \leq \lambda_s, \tag{1}$$

and at least one of the inequalities is strict, then clearly the parameter set $(\lambda'_p, \lambda'_s, B'_s)$ provides a better characterization of the cell stream.

Given a cell stream of finite length, the minimum inter-cell spacing $T_{min}$ (subject to a specified tolerance) can be estimated. The peak rate is taken as:

$$\lambda_p = 1/T_{min} \tag{2}$$

Suppose a fictitious G/D/1 queue is simulated with the cell stream as input and a constant service rate $\mu$. Let $B_{max}(\mu)$ be the maximum number of customers observed in the system over the duration of the cell stream. The cell stream is characterized by equation (3)

$$C_D = [\lambda_p; B_{max}(\mu), 0 < \mu < \lambda_p] \tag{3}$$

For a fixed $\lambda_s$, the optimal UPC descriptor is $(\lambda_p, \lambda_s, B_{max}(\lambda_s))$, in the sense that if the cell stream conforms to $(\lambda_p, \lambda_s, B'_s)$, then necessarily $B'_{max} \leq B_s(\lambda_s)$.

The deterministic characterization described above may be too conservative, especially if the user is able to tolerate some delay or loss due to violations of the declared UPC parameters. Moreover, this characterization can only be obtained off-line if the entire cell stream is known a priori.

Next, a statistical characterization of the cell stream is described which aims to capture the properties of the stream that determine the amount of resources which should be allocated to it.

Let $\lambda_p$ and $\lambda_m$ be, respectively, the peak and mean rates of the cell stream. Suppose that a cell stream is offered to a leaky bucket traffic shaper with a rate $\mu$, where $\mu \in (\lambda_m, \lambda_p)$ In the queuing model of the leaky bucket, a fictitious stream of customers is offered to a queue served at constant rate $\mu$. Assume a fictitious G/D/1 queue is simulated with the cell stream as input and a constant service rate $\mu$. For a given constraint specified by the source, which constraint can either be a violation probability or a shaping probability $\epsilon$, there exists a minimum queue size $B(\mu, \epsilon)$ that satisfies the constraint.

The pair of values $(\mu, B(\mu, \epsilon))$ gives a statistical characterization of the effect on the cell stream when it is offered to a leaky bucket with a rate $\mu$. A more complete characterization of the cell stream records the values $(\mu, B(\mu, \epsilon))$ for all $\mu$ in the range $(\lambda_m, \lambda_p)$. The statistical characterization of the cell stream is denoted as follows:

$$C_S = [C_S(\epsilon): 0 < \epsilon < 1],$$

where, $$C_S(\epsilon) = [\lambda_p; \lambda_m; (\mu, B(\mu, \epsilon)), \lambda_m < \mu < \lambda_p]$$

The above characterization is analogous to the notion of "peakedness" used in teletraffic theory.

The quantity $B(\mu, \epsilon)$ that provides the statistical characterization of the offered stream can be obtained by monitoring the fictitious G/D/1 queue to which the traffic stream to be characterized is offered.

As previously described, let $\lambda_p$ and $\lambda_m$ be respectively, the peak and mean rates of the offered cell stream. Let the cell stream be offered to a leaky bucket traffic shaper with leak rate $\mu$, in the range $(\lambda_m, \lambda_p)$. In the queuing model of the leaky bucket, a stream of customers is offered to a fictitious queue served at a constant rate $\mu$. Let W denote the steady-state waiting time in the system, of an arbitrary customer arriving to the queue. It is assumed that the tail waiting time distribution has the exponential form:

$$P(W>t)=a(\mu)e^{-b(\mu)t}, t\geq 0 \qquad (4)$$

where a and b are functions of $\mu$. The exponential form of equation (4) is asymptotically true in t, with fairly weak assumptions on the nature of the arrival process. More generally, the parameter 'a' in equation (4) could be a function of time 't'. Indeed, the asymptotic theory of 'effective bandwidths' makes the further assumption that a=1. For the relatively short observation windows of interest (on the order of seconds), the approximations assumed herein appear to be robust over a reasonably large class of real traffic sources.

The pair of values $(a(\mu), b(\mu))$ gives a statistical characterization of the effect of the cell stream when offered to a leaky bucket with a constant rate $\mu$. In summary, the characterizing step described in section 1 and the present section, i.e., section 2, includes the following steps:

(a) offering the traffic stream to a bank of N constant service rate queues with spaced rates that are spaced between an estimated mean rate $\lambda_m$ and an estimated peak rate $\lambda_p$, where the spaced rates are candidates for sustainable rates;

(b) approximating a tail waiting time distribution for each of the queues by the exponential form given by equation (4), where $\mu$ is a constant service rate and one of the candidate sustainable rates; and (c) estimating parameters $a(\mu)$ and $b(\mu)$ of the exponential equation (4).

The mapping step comprises the steps of:

(a) computing, for each of the candidate sustainable rates $\mu$ used in the characterizing step, a corresponding value $B_s(\mu)$ for a smallest sustainable bucket size such that a sustainable rate leaky bucket with parameters $(\mu, B_s(\mu))$ satisfies a constraint which bounds one of a cell violation probability and a mean shaping delay;

(b) computing, for each of the candidate sustainable rates $\mu$ used in the characterizing step, a corresponding value $c(\mu_p, \mu, B_s(\mu))$ of the cost function that determines cost to the network;

(c) selecting, among the candidate sustainable rates, an optimal sustainable rate $\mu=\lambda^*_s$ that minimizes the cost function $c(\lambda_p, \mu, B_s(\mu))$; and (d) choosing new UPC values that include the peak rate $\lambda_p$, the optimal sustainable rate $\lambda_s^*$, and the sustainable bucket size $B_s(\lambda_s^*)$.

A more complete characterization of the cell stream records the values $(a(\mu), b(\mu))$ for all $\mu$ in the range $(\lambda_m, \lambda_p)$. The cell stream is statistically characterized by equation (5):

$$\bar{C}_S=[\lambda_p; \lambda_m;((a(\mu),b(\mu)): \lambda_m\leq\mu\leq\mu_p)] \qquad (5)$$

Values of $(a(\mu), b(\mu))$ are chosen such that equation (4) holds approximately for values of t in the range of interest. With the assumption of equation (4), equation (6) is obtained:

$$a/b=E[W]=\tau_r E[S_a]+E[Q_a]/\mu \qquad (6)$$

where $S_a\in\{0, 1\}$ and $Q_a\in Z_+$ denote, respectively, customers in service and the number of customers in queue seen by an arbitrary customer arrival. In equation (6), $\tau_r$ is the average remaining service time for the customer in service as seen by an arriving customer, conditional on there being a customer in service. Note that $$E[S_a]=P(W>0)=a \qquad (7)$$

Defining $q=E[Q_a]$, and solving for b in equation (6), equation (8) is obtained:

$$b(\mu) = \frac{a(\mu)\mu}{\mu\tau_r(\mu)a(\mu) + q(\mu)} \qquad (8)$$

where the dependence of the quantities a, q, $\tau_r$, on the service rate $\mu$ has been explicitly shown in equation (8). Then, after getting the quantities a, q, $\tau_r$, e.g., by measurement thereof, a corresponding value for b can be obtained via equation (8).

For a fixed service rate $\mu$, the quantities $a(\mu)$ and $q(\mu)$ can be estimated from observations of a fictitious queue served at the constant rate $\mu$ according to the following 'For Loop' procedure:

for i=1 to M do 1. allow $N_i$ arrivals to pass, where $N_i$ is a random integer with a sufficiently large mean;
2. let $S_i$, $Q_i$, and $T_i$ be, respectively, the number in service, the number in queue, and the remaining time of the customer in service (or $T_i=0$ if no customer is in service) as seen by the next arrival.

end for

In step 1 of the 'For Loop' procedure, the number of arrivals $N_i$ that is passed should be large enough to ensure that an "arbitrary" arrival is selected. The number of trials, M, should also be sufficiently large to ensure accuracy of the estimated quantities $a(\mu)$ and $q(\mu)$. The estimates for "a" and "q" are given by the sample means:

$$\hat{a} = \frac{1}{M}\sum_{i=1}^{M} S_i \qquad \hat{q} = \frac{1}{M}\sum_{i=1}^{M} Q_i \qquad (9)$$

Similarly, an estimate for $\tau_r$ is $$\hat{\tau}_r = \frac{1}{\hat{a}M}\sum_{i=1}^{M} T_i \qquad (10)$$

Using the estimates $\hat{a}$, $\hat{q}$, and $\hat{\tau}_r$, an estimate for "b" can be obtained from equation (8).

In summary, the parameters $a(\mu)$ and $b(\mu)$, shown in equation (4), of the tail waiting time distribution for each queue of constant service rate $\mu$, are estimated using the steps of:

(a) estimating an average remaining service time, $\tau_r(\mu)$, for a customer in service as seen by an arriving customer conditional on there being a customer in service;

(b) estimating a probability that an arbitrary arriving customer sees a customer in service, and setting $a(\mu)$ equal to this probability;

(c) estimating $q(\mu)$, which is an expected number of customers in a queue seen by the arbitrary arriving customer; and (d) computing $b(\mu)$ according to equation (8).

Alternatively, a reasonable approximation for $\tau_r$, under moderate to heavy utilization is $\tau_r\approx 1/(2\mu)$. This leads to the estimate given by equation (11):

$$\hat{b} = \frac{\hat{a}\mu}{\frac{\hat{a}}{2} + \hat{q}} \quad (11)$$

In a practical implementation, estimates $\hat{\lambda}_p$ and $\hat{\lambda}_m$ of the peak and mean cell rates, respectively, would first be obtained over a time window. The estimates for $\hat{a}(\mu)$ and $\hat{b}(\mu)$ would be obtained for a finite set of values in the range $\hat{\lambda}_m < \mu < \hat{\lambda}_m$.

3: Method for Mapping Traffic Characterization to UPC Values

Next, a method of mapping the statistical characterization $C_s$ to a set of UPC values is described.

3.1: Formulation as Optimization Problem

The problem of mapping the statistical characterization to a set of UPC values is formulated as an optimization problem that minimizes a cost function $c(\lambda_p, \lambda_s, B_s)$ as follows:

$$P: \min_{\lambda_s, B_s} C(\lambda_p, \lambda_s, B_s) \quad (12)$$

subject to:

$$g(C_S, \lambda_s, B_s) \leq \epsilon \quad (13)$$

$$B_s \geq 0 \quad (14)$$

$$\lambda_m \leq \lambda_s \leq \lambda_p \quad (15)$$

Here the peak rate $\lambda_p$ and the mean rate $\lambda_m$ are assumed to be known constants. The cost function $c(\lambda_p, \lambda_s, B_s)$ is an increasing function of each of its arguments, namely, of $\lambda_p$, $\lambda_s$, $B_s$, and represents the cost to the network of accepting a call characterized by the UPC parameters $(\lambda_p, \lambda_s, B_s)$. Since the network cost is ultimately linked to the amount a user will be charged for the call, it is in the user's best interest to minimize the cost function.

The shaping constraint given by of equation (13) is defined in terms of a function g, of the traffic characterization $C_s$ and the UPC parameters $(\lambda_s, B_s)$ This function g measures the degree to which the cell stream will be shaped by the sustainable rate leaky bucket. Shaping produces a smoother traffic stream. Smoother streams allow the network to statistically multiplex more calls and hence reduce the cost per call.

The constraint on shaping given by equation (13) places a bound on the amount of shaping that can be tolerated by the source. The other two constraints, given by equations (14) and (15), ensure that the choice of parameter values is feasible.

The function g is decreasing in its last two arguments, namely, the sustainable rate $\lambda_s$ and the sustainable bucket size $B_s$. Hence, there exists an optimal solution $(\lambda_s, B_s)$ that satisfies the shaping constraint at the equality given in equation (16):

$$g(C_S, \lambda_s, B_s) = \epsilon \quad (16)$$

Based on the equality constraint of equation (16), the sustainable bucket $B_s$ can be solved as a function of $C_S$, $\lambda_s$, and $\epsilon$, i.e., $$B_s = B_s(C_S, \lambda_s, \epsilon) \quad (17)$$

Then, the problem P given by equation (12) can be recast as an optimization problem in the single variable $\lambda_s$ as shown by equation (18):

$$P_1: \min_{\lambda_s} c(\lambda_p, \lambda_s, B_s(C_S, \lambda_s, \epsilon)) \quad (18)$$

subject to:

$$B_s(C_S, \lambda_s, \epsilon) \geq 0 \quad (19)$$

$$\lambda_m \leq \lambda_s \leq \lambda_p \quad (20)$$

3.2: Shaping Constraints

Next, two types of shaping constraints that the user may specify are discussed. Consider a leaky bucket policer with parameters $(\mu, B)$. Upon arrival, a cell is transmitted immediately if and only if the state counter X satisfies equation (21):

$$X < B \quad (21)$$

Otherwise, the cell will be either marked or dropped. Assume that the user imposes the constraint that the leaky bucket parameters $(\lambda_p, \lambda_s, B_s)$ must be chosen such that the probability that an arbitrary cell will be in violation is less than $\epsilon$. Note that a low violation probability means a low probability of mutilation or shaping of the cell stream.

Recalling that the state counter X may be viewed as the number of customers in a fictitious G/D/1/B queue, as described in connection with FIG. 2, the condition of equation (21) is equivalent to equation (22):

$$W < B/\mu \quad (22)$$

where W represents the waiting time (including time in service) experienced by an arriving customer to the fictitious queue. The probability that an arbitrary cell will be in violation of the leaky bucket parameters is given by equation (23):

$$p_v(C_S, \mu, B) = P(W \geq B/\mu) \approx a(\mu) e^{-b(\mu)B/\mu} \quad (23)$$

where the assumption of the exponential equation (4) has been used. Setting $P_v$ equal to the constant $\epsilon \in (0,1)$, and solving for the bucket size yields equation (24):

$$B_s(\mu) = \frac{\mu}{b(\mu)} \log\left(\frac{a(\mu)}{\epsilon}\right) \quad (24)$$

By choosing the parameter values $(\lambda_s, B_s)$ to satisfy equation (25):

$$p_v(C_S, \lambda_s, B_s) \leq \epsilon \quad (25)$$

where $\epsilon$ is small, an approximate characterization of the source is obtained which incorporates a slight mutilation of the traffic characteristics due to violation. The probability that the stream violates the chosen UPC parameters $(\lambda_s, B_s)$ is kept small according to equation (25). However, when a violation occurs, the source is shaped (by discarding or marking the violating cell) to conform to the UPC.

A more natural shaping criterion can be formulated in terms of the delay experienced by an arbitrary cell passing through the leaky bucket. Here, the user allows its cell stream to be shaped with relatively high probability, subject to constraints on the extent of the shaping. The constraints that are considered include:

1. Limits on the expected cell delay at the shaper, i.e., constraints of the form $E[D] \leq \overline{D}$; and 2. Limits on the tail probability distribution of the cell delay at the shaper, i.e., constraints of the form $P(D>D_{max}) \leq \epsilon_D$.

Consider a cell stream passing through a leaky bucket traffic shaper with parameters ($\mu$, B). Recall that the state counter X may be viewed as the number of customers in a fictitious G/D/1 queue. As before, let W represent the waiting time in the queue experienced by a given customer arriving to the fictitious queue served at rate $\mu$. The actual delay experienced by the cell corresponding to the given fictitious customer can be expressed as:

$$D = \max(0, W - B/\mu) \quad (26)$$

Using equation (4) for the complementary waiting time distribution, the probability that D exceeds a delay bound $D_{max}$ is given by equation (27):

$$P(D > D_{max}) = P(W > B/\mu + D_{max}) \quad (25)$$
$$= a(\mu) e^{-b(\mu) D_{max}} e^{-b(\mu) B/\mu}$$

Setting $P(D>D_{max})=\epsilon$, $\epsilon \in (0, 1)$, and solving for the bucket size B, gives:

$$B = \frac{\mu}{b(\mu)} \left[ \log\left(\frac{a(\mu)}{\epsilon}\right) - b(\mu) D_{max} \right] \quad (28)$$

Similarly, an expression for the mean cell delay through the shaper is readily obtained as follows:

$$E[D] = \int_0^\infty P\left(W > \frac{B}{\mu} + z\right) dz \quad (29)$$
$$\approx e^{-b(\mu) B/\mu} E[W]$$
$$= \frac{a(\mu)}{b(\mu)} e^{-b(\mu) B/\mu}$$

Setting the expected delay equal to the target mean delay $\overline{D}$ determines B as the following function of $\mu$ and $\overline{D}$:

$$B = B_s(\mu) = \frac{\mu}{b(\mu)} \log\left(\frac{a(\mu)}{b(\mu) \overline{D}}\right) \quad (30)$$

Figure 6:
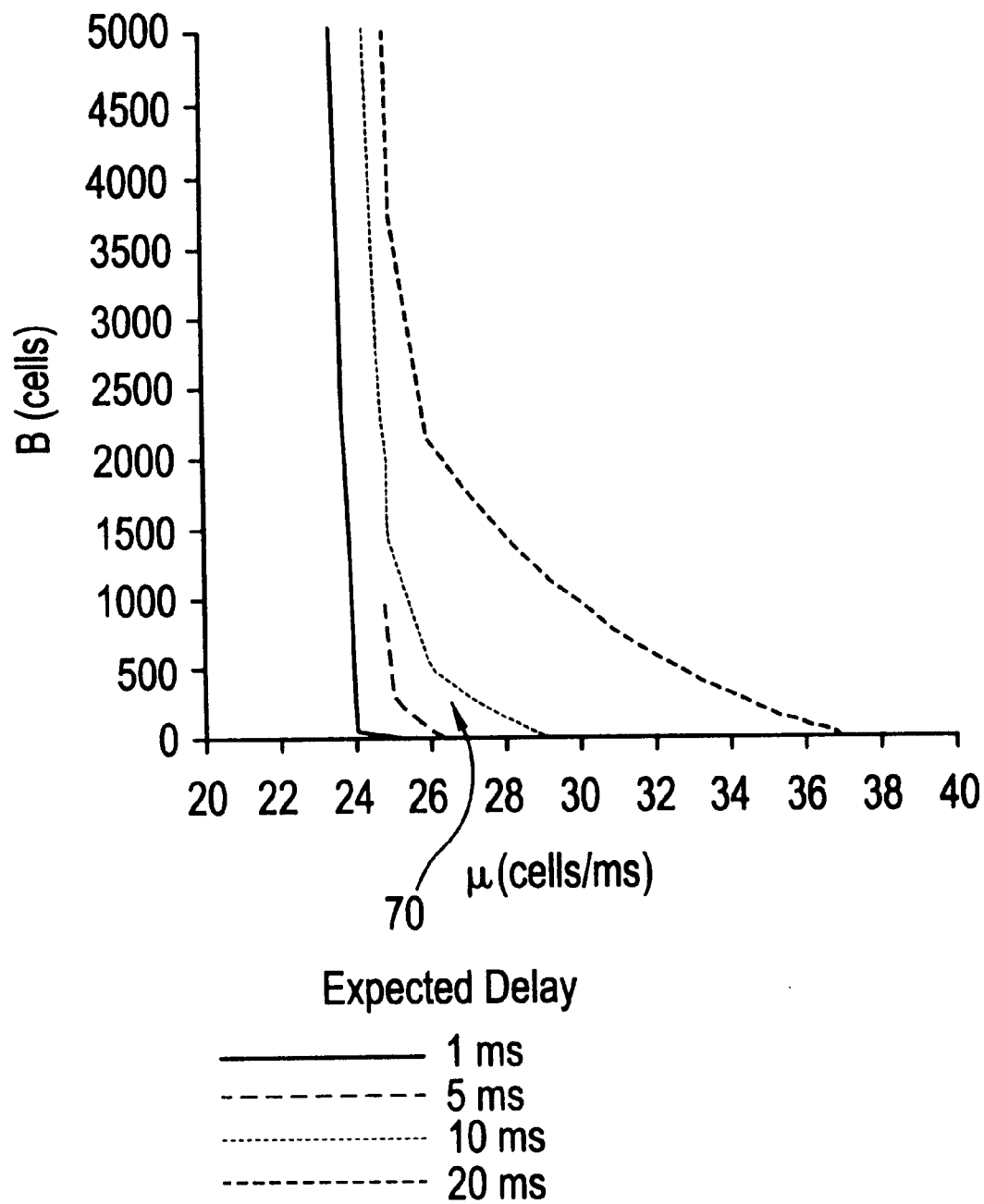
FIG. 6 shows a plot of the bucket size B versus the rate $\mu$ for the 'mobi' sequence for several values of user-specified mean delay according to the present invention.

For a constant expected delay, the curve $B(\mu)$, shown in FIG. 6 as a function of $\mu$, is referred to as a mean delay constant curve.

In summary, a smallest sustainable bucket size, $B_s(\mu)$ is computed for each candidate sustainable rate $\mu$, such that a sustainable rate leaky bucket with parameters ($\mu, B_s(\mu)$) satisfies a constraint on the violation probability or the mean shaping delay according to equation (24), when the violation probability is constrained to be no larger than a predetermined violation probability $\epsilon$, and according to equation (30), when the mean shaping delay is constrained to be no more than the predetermined mean shaping delay $\overline{D}$.

The second moment of the cell delay can easily be computed as:

$$E[D^2] = \frac{2 a(\mu)}{b^2(\mu)} e^{-b(\mu) B/\mu} \quad (31)$$

Hence, the variance of the delay, or the delay jitter is given by:

$$\sigma_D^2 = E[D^2] - E^2[D] \quad (32)$$
$$= E[D] \left[ \frac{2}{b(\mu)} - E[D] \right]$$

For a constant mean delay $E[D]=\overline{D}$, the delay jitter becomes $$\sigma_D^2 = \overline{D} \left[ \frac{2}{b(\mu)} - \overline{D} \right] \quad (33)$$

Since $b(\mu)$ is generally an increasing function of $\mu$, the delay jitter $\sigma_D^2$ (for constant mean delay $\overline{D}$) will be a decreasing function of $\mu$. This agrees with the intuition that the delay should be more highly variable as the service rate $\mu$ approaches the mean rate. This suggests that, in general, the region of rates near the mean should be avoided.

3.3: Cost Function

For a given shaping constraint, there is a continuum of ordered pairs ($\mu, B_s(\mu)$) that can be used as sustainable rate leaky bucket parameter values. Next, guidelines are provided for picking the optimal pair from the set determined by the shaping constraint. A cost function $c(\lambda_p, \lambda_s, B_s)$ is developed which approximately captures the amount of bandwidth resource that should be allocated to a call with UPC parameters ($\lambda_p$, $\lambda_s$, $B_s$) at a multiplexer or switch traversed by the call. The cost function should depend on the multiplexer buffer size, $B_{mux}$, and the required cell loss probability, $\epsilon_{mux}$.

Two notions are used that have appeared in the literature: worst-case conforming sources and effective bandwidths. Given the UPC parameters ($\lambda_p, \lambda_s, B_s$), consider a random source with periodic on-off sample paths and random offsets. The lengths of the on and off periods are, $T_{on}$ and $T_{off}$ respectively, are given by equation (34):

$$T_{on} = \frac{B_s}{\lambda_p - \lambda_s} \quad \text{and} \quad T_{off} = \frac{B_s}{\lambda_s} \quad (34)$$

During the on periods, the source generates cells at the constant rate $\lambda_p$ and is silent during the off periods. This source is referred to as a full rate on-off source. Each cycle begins with an on-period during which the source transmits at peak rate, until the state counter X reaches the limit $B_s$. Then, the source is silent during the off-period until the counter decrements to zero (at the leak rate $\lambda_s$).

This type of source yields the highest steady-state cell loss probability among homogeneous superpositions of independent UPC-conforming random sources at a bufferless multiplexer. However, it can be shown that this is not true in the buffered case. Nevertheless, simulations of statistical multiplexer performance suggest that the assumption of full-rate sources tend to be conservative even in the buffered case.

The effective bandwidth of a source is defined to be the minimum capacity required to serve the traffic source so as to achieve a specified steady-state cell loss probability $\epsilon_{mux}$. An approximate effective bandwidth result can be obtained via a diffusion process approximation of an on-off source. The approximation depends on the distributions of the on and off periods only through their respective means and variances. The effective bandwidth result from the diffusion process approximation has the form given by equation (35):

$$\tilde{c}_{\it eff} = r\overline{y} + \frac{r^2\sigma^2}{\alpha+\beta}\log\frac{(1/\epsilon_{\it max})}{B_{\it max}} \quad (35)$$

where $\overline{y}$ and $\sigma^2$ are, respectively, the mean and variance of the stationary (Gaussian) distribution of the diffusion process approximation, and $B_{mux}$ is the multiplexer buffer size.

Suppose the on and off periods are distributed according to Erlang-k distributions. For k=1, the source model is a Markov on-off fluid source, and as k increases, the variability in the on and off periods decreases. For fixed k, the effective bandwidth from Equation (35) becomes:

$$\tilde{c}_{\it eff} = \frac{r\alpha}{\alpha+\beta} + \frac{r^2\alpha\beta}{(\alpha+\beta)^3}K \quad (36)$$

where $$K = \frac{\log(1/\epsilon_{\it max})}{2kB_{\it max}} \quad (37)$$

If the mean on and off periods are set as $\beta^{-1}=T_{on}$, and $\alpha^{-1}=T_{off}$, respectively, the effective bandwidth expressed in terms of the UPC parameters is:

$$\tilde{c}_{\it eff} = \lambda_s + K\lambda_s(\lambda_p - \lambda_s)\frac{B_s}{\lambda_p} \quad (38)$$

This expression has the following interpretation: the bandwidth allocated to a UPC-controlled source is the sustainable rate $\lambda_s$ plus a component due to the burstiness of the source. Using equation (38), we define the following cost function for a UPC-controlled source:

$$c(\lambda_p, \lambda_s, B_s) = \min\left(\lambda_p, \lambda_s + K\lambda_s(\lambda_p - \lambda_s)\frac{B_s}{\lambda_p}\right) \quad (39)$$

where K as given by equation (37), is a parameter which can be chosen to match approximately the connection admission control (CAC) function used by the network. Note, that $C_{\it eff}$ achieves the maximum value of $\lambda_p$ at $\lambda_s=\lambda_p$, independent of the value of $B_s$. This corresponds to allocation at the peak rate. Furthermore, when $B_s=1$, which corresponds to allocation at the sustainable rate, the cost function reduces to approximately $\lambda_s$.

In summary, the approximate required resource is computed as a cost function, $c(\lambda_p, \lambda_s, B_s)$ of a predetermined UPC set $(\lambda_p, \lambda_s, B_s)$ according to equation (39).

In problem $P_1$, shown in equations (18) to (20), the bucket size $B_s$ is a function of the sustainable rate $\lambda_s$, the statistical characteristics of the source as captured in $C_s$ and the shaping parameter $\epsilon$.

As $\lambda_s$ approaches the mean rate $\lambda_m$, in principle, $B_s \to \infty$, and correspondingly, the cost function approaches $\lambda_p$. Hence, the objective function in problem $P_1$ attains a minimum value for some value of $\lambda_s \in (\lambda_m, \lambda_p)$. The cost function provides a measure for assessing the trade-off between the parameters $(\lambda_s, B_s)$. The cost function depends on the parameter K, which should be chosen such that the cost function approximates the CAC policy employed by the network. Formally, the parameter K given by equation (37) depends on the multiplexer buffer size, $B_{mux}$, the loss probability $\epsilon_{mux}$, and the degree of variability assumed in the on and off periods of the full rate source model, as captured in the parameter k.

An alternative criterion that may be used to choose the operating UPC parameters is a constraint on the probabilistic delay bound: $P(D>D_{max}) \leq \epsilon_D$. The UPC parameter values could be chosen to minimize the cost function subject to satisfying this constraint. FIG. 8b shows curves for $P(D>D_{max})$ as a function of the rate $\mu$ for various values of $D_{max}$. If the peak-to-mean ratio $\lambda_p$: $\lambda_m$ is not significantly greater than one, then not much is lost by assigning $\lambda_s=\lambda_p$ (i.e., peak rate allocation).

4. Method for On-Line UPC Estimation

The statistical characterization, $C_S$, includes the peak rate $\lambda_p$, the mean rate $\lambda_m$, and the functions $a(\mu)$ and $b(\mu)$ over the range $\mu \in (\lambda_m, \lambda_p)$. In practice, the peak and mean rates must be estimated from observations of the cell stream. The functions $a(\mu)$ and $b(\mu)$ can only be estimated for a finite set of values of $\mu$.

4.1: Pipelined Approach

The observation window, I, is divided into two sub-intervals, $I_1$ and $I_2$, each of duration T seconds. The mean and peak rates, $\lambda_m$ and $\lambda_p$, respectively, are estimated over $I_1$. These estimates determine a range $(\hat{\lambda}_m, \hat{\lambda}_p)$ of rates over which the functions $a(\mu)$ and $b(\mu)$ are estimated in the second sub-interval $I_2$. For example, at the end second sub-interval of $I_2$, the approximate statistical characterization, $C_S$, is mapped to a set of UPC parameters that minimize the bandwidth requirement of the network subject to predetermined constraints of a user, such as quality-of-service (QoS) constraints.

To adapt to possible changes in traffic characteristics, the operations in the observation interval $I=(I_1, I_2)$ can be repeated over the next time interval of length 2T. This produces a sequence $I(n)=(I_1(n), I_2(n))$, n=1.2 . . . , of observation windows, with a corresponding sequence of UPC parameter values $U(n)=(\lambda_p(n), \lambda_s(n), B_s(n))$. Thus, a new set of UPC parameters is produced once every 2T seconds.

Figure 12:
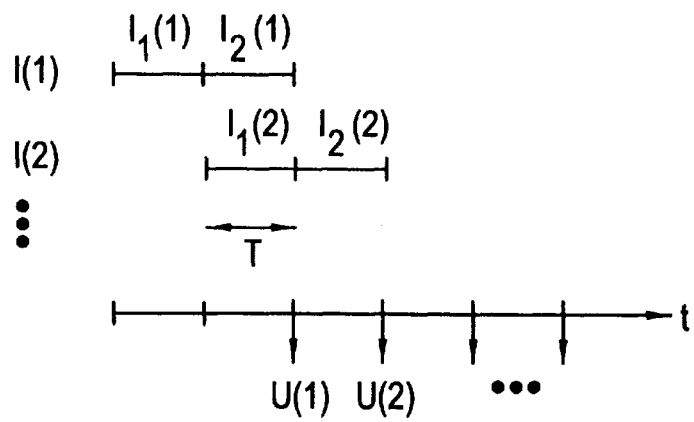
FIG. 12 shows a pipelined implementation of real-time dynamic UPC estimation according to the present invention.

Since the operations of the sub-intervals $I_1$ and $I_2$ can be carried out independently over any given T-second time interval, the observation windows I(n) can be staggered so that they overlap by T seconds. This is shown in FIG. 12, where the second sub-interval $I_2(1)$ of the first interval I(1) overlaps the first sub-interval $I_1(2)$ of the second interval I(2) over the interval T. In this case, a new set of UPC parameters is produced once every T seconds. More importantly, this pipelined measurement facilitates the use of past information to smooth estimates derived from observations over a given sub-interval.

Another feature of the pipelined approach is that the nth statistical characterization $C_s(n)$ can be derived using the more recent peak and mean rate estimates over $I_1(n+1)$ rather than those over $I_1(n)$.

4.1.1: Numerical Examples

Next, experimental results are discussed from applying the inventive method for UPC parameter estimation on an MPEG video sequence called 'mobi'. In the MPEG standard for video compression, video is coded as a sequence of frames with variable sizes at a constant rate of 30 frames per second. Typically, the cell stream produced by an MPEG source is highly bursty.

Figure 4A:
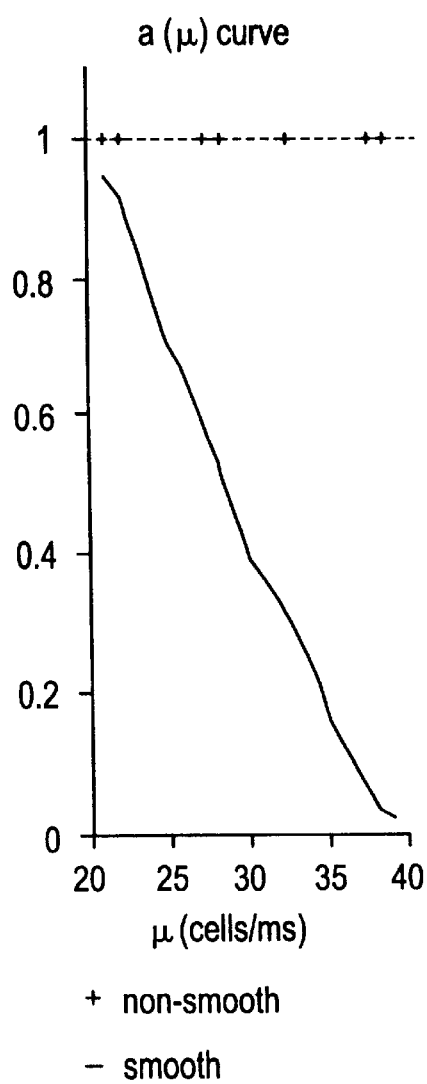
FIGS. 4a and 4b show plots of the statistical characterization of the MPEG 'mobi' sequence for both smooth and non-smooth transmission modes in terms of parameters a($\mu$) and b($\mu$) as functions of rate $\mu$ according to the present invention.
Figure 4B:
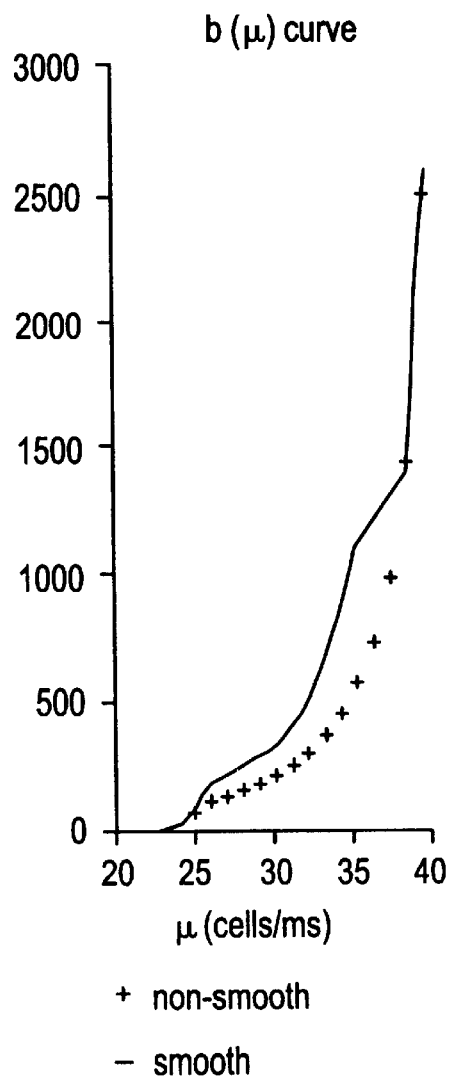

FIGS. 4a and 4b show the results of an empirically obtained statistical characterization for 60 seconds of 'mobi' in both non-smooth and smooth transmission modes. For this stream, the empirical mean and peak rates were determined to be $\lambda_m=20$ and $\lambda_p=40.5$, respectively, in units of cells/ms.

The curves in FIGS. 4a, 4b were obtained by offering the streams to nineteen fictitious queues running in parallel at the rates $\mu=21,22\ldots,39$ (cells/ms) and obtaining the corresponding values for $(a(\mu),b(\mu))$ according to the procedure described above. In the non-smooth mode, $a(\mu)\approx1$ for all values of $\mu$ that range from $\lambda_m=20$ cells/ms to $\lambda_p=40.5$ cells/ms because an arbitrary cell arrival nearly always sees at least one cell in service.

By contrast, for the smooth mode shown as solid lines in FIGS. 4a, 4b, $a(\mu)$ monotonically decreases as $\mu$ increases from $\lambda_m$ to $\lambda_p$. Observe that the $b(\mu)$ curves of FIG. 4b, for the non-smooth and smooth modes are close for $\mu$ near the extremes $\lambda_m$ and $\lambda_p$. For values of $\mu$ closer to the center of the interval $(\lambda_m,\lambda_p)$, the $b(\mu)$ curve of FIG. 4b for the smooth mode, shown as a solid line, lies above the curve for non-smooth mode, shown as a series of '+' signs. This indicates, as expected, that the queuing behavior of the video stream transmitted in non-smooth traffic is worse from the standpoint of queuing behavior.

Figure 5:
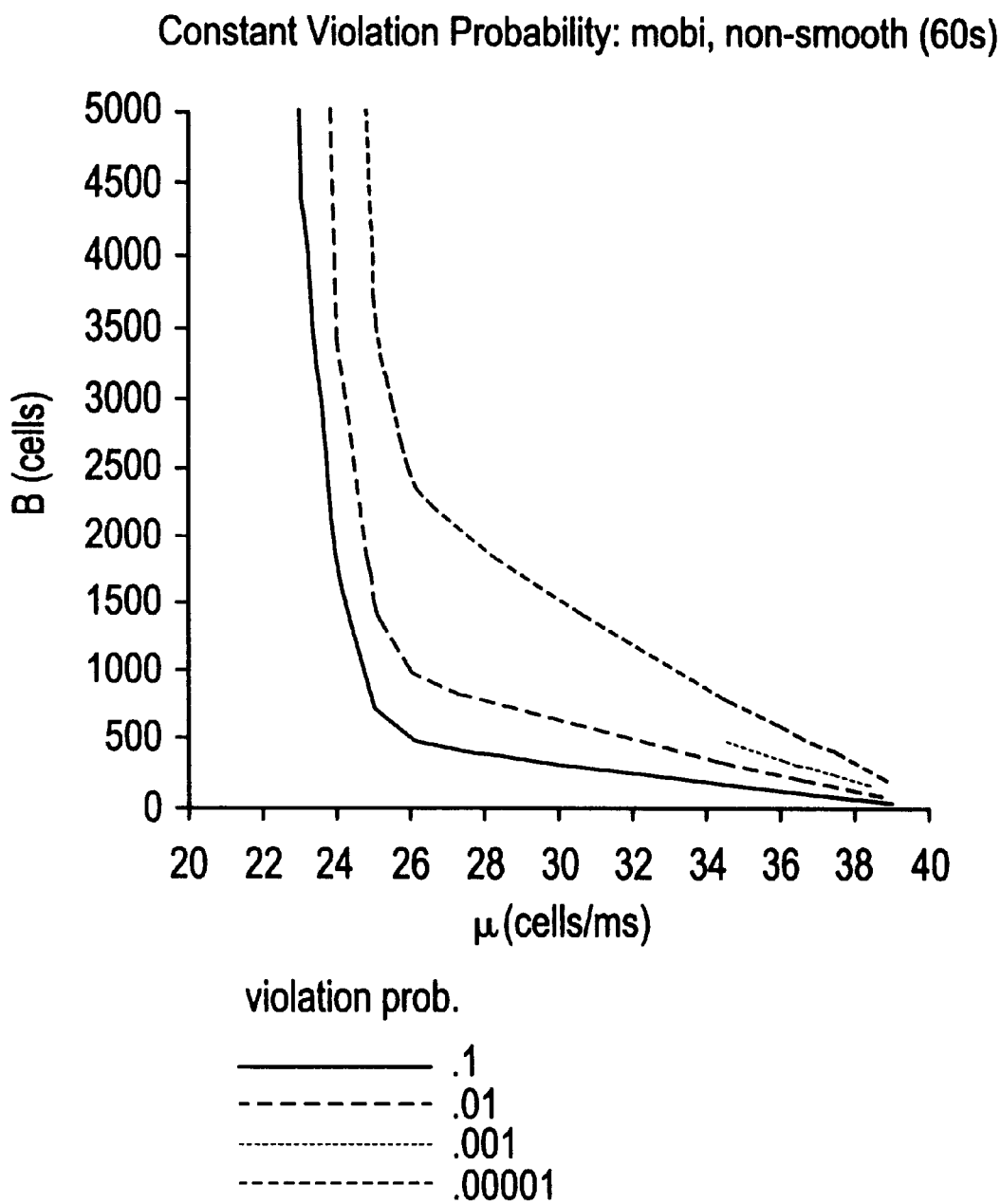
FIG. 5 shows a plot of the bucket size B versus the rate $\mu$ for the 'mobi' sequence for several values of user-specified violation probabilities according to the present invention.

FIG. 5 shows plots of the curves $B_s(C_s,\mu,\epsilon)$ for the 'mobi' sequence transmitted in non-smooth mode for several values of $\epsilon$, which is the target violation or shaping probability. The constraint curves obtained from the statistical characterization give the general behavior of the UPC parameters for different values of the target violation probability $\epsilon$. For practical purposes, a violation probability $\epsilon$ in the neighborhood of $10^{-2}$ or $10^{-1}$ typically results in almost negligible mutilation of the source cell stream.

Figure 7:
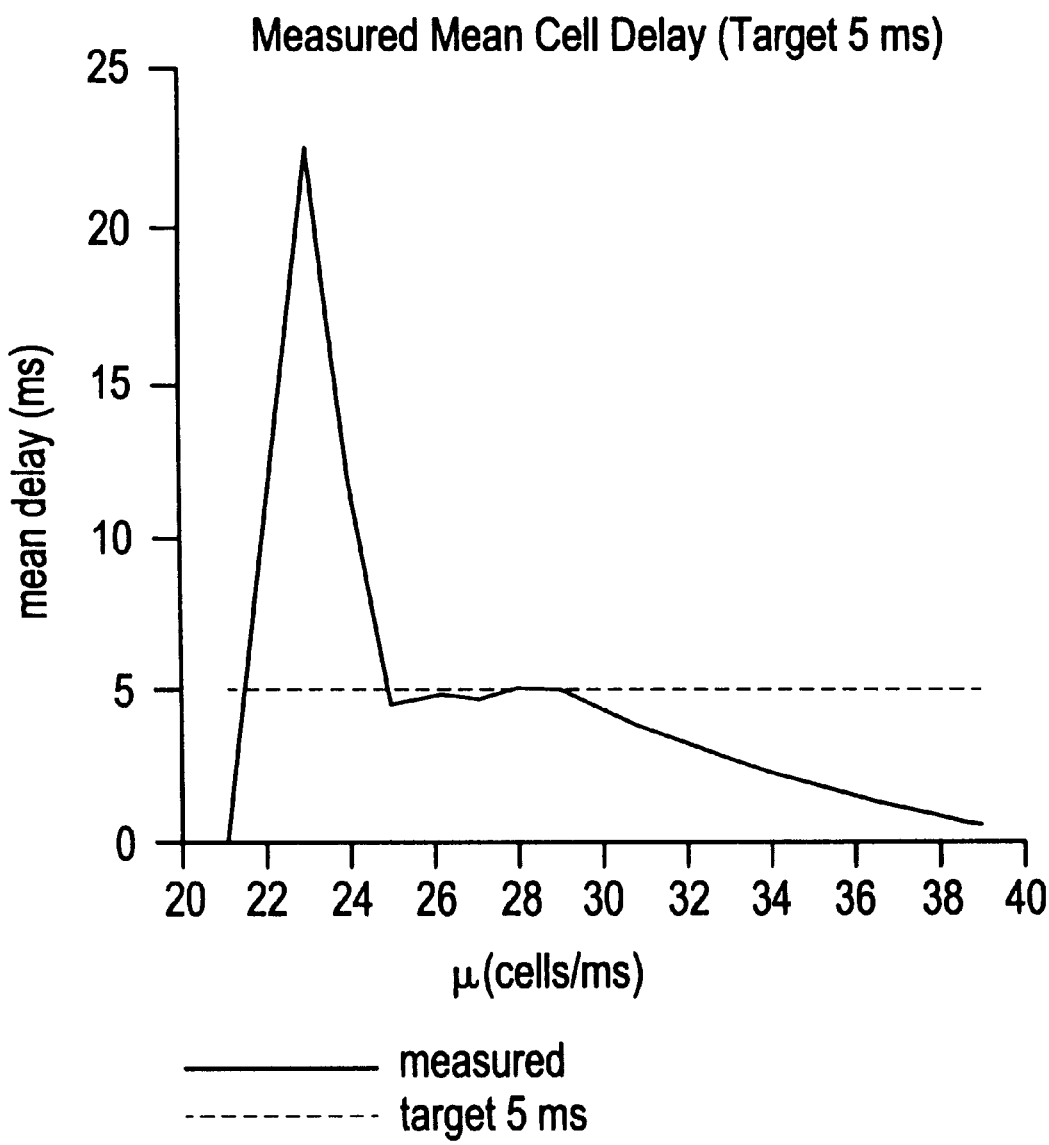
FIG. 7 shows a plot of the measured mean cell delay resulting from a set of UPC values selected to achieve a 5 ms mean shaping delay according to the present invention.

FIG. 6 shows plots of the curves $B_s(C_s,\mu,\overline{D})$ for the non-smooth MPEG data, for several values of expected delay $\overline{D}$ (in ms). Using the pairs of leaky bucket parameters $(\mu,B_s(\mu))$ from the vertical and horizontal axes of these curves, simulations were performed which applied the 'mobi' sequence to leaky buckets with parameter values taken from the curves in FIG. 6 in order to measure the actual expected delay corresponding to the pairs $(\mu,B_s(\mu))$. FIG. 7 shows the results of this experiment by plotting the measured expected delay along with the target expected delay of 5 ms as a function of the service rate $\mu$. The target mean delay of 5 ms, shown as a dashed line in FIG. 7, is met for rates $\mu\geq25$ cells/ms. This indicates that the statistical characterization and mapping to parameter values is accurate in this range.

For rates $\mu$ in the neighborhood of 22–23 cells/ms, the bucket sizes selected by this scheme are not large enough to meet the target mean delay. This suggests that care must be taken in choosing rates in the critical region between the mean rate and the rate corresponding to the knee 70 of the expected delay constraint curve shown in FIG. 6.

Figure 8A:
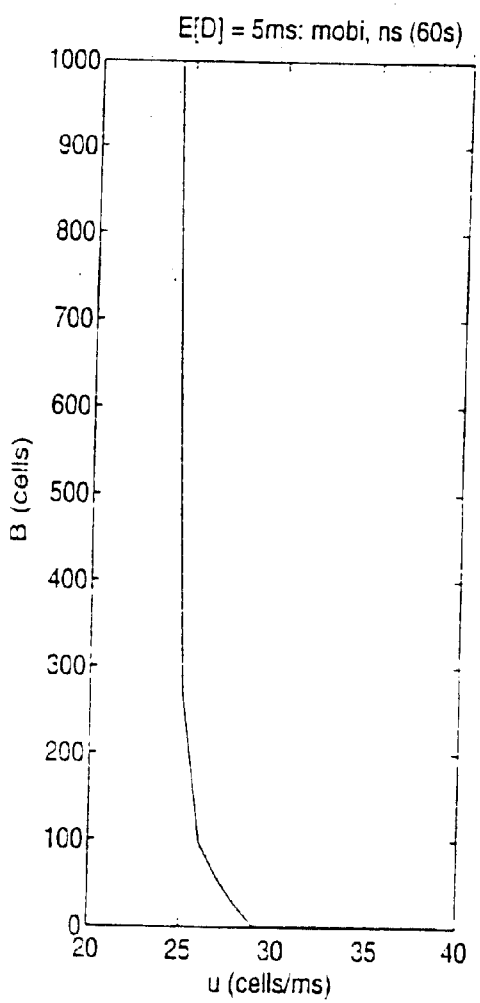
FIGS. 8a and 8b show curves of bucket size B versus rate $\mu$ for a mean shaping delay of 5 ms, and the probabilistic delay bound $P(D>D_{max})$ as a function of $\mu$ according to the present invention.
Figure 8B:
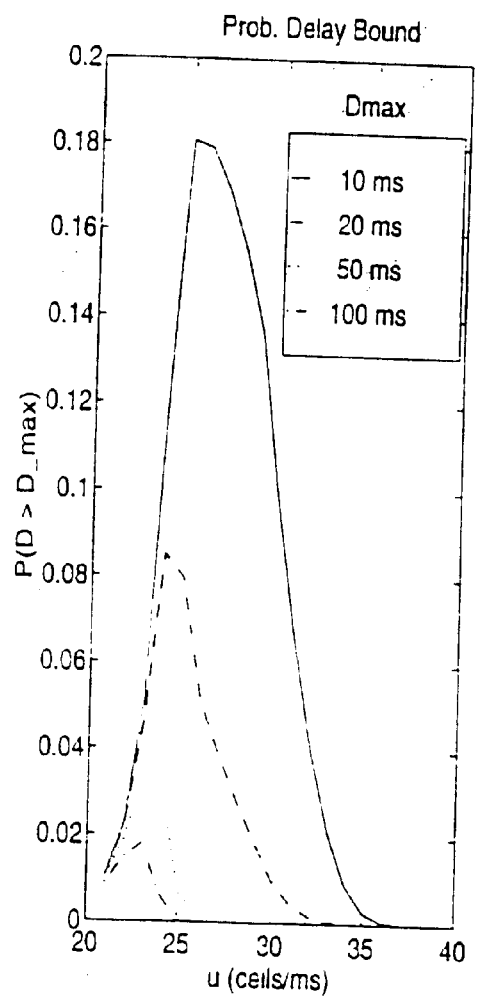

FIG. 8a displays the expected delay constraint curve for a constant expected delay of 5 ms. In FIG. 8b, the corresponding probabilistic delay bound curves are shown for several values of $D_{max}$. Note that each of the delay bound curves has a maximum in the neighborhood where the slope of the expected delay curve experiences a sharp increase. This further suggests that this region should be avoided in selecting the sustainable rate.

Figure 9A:
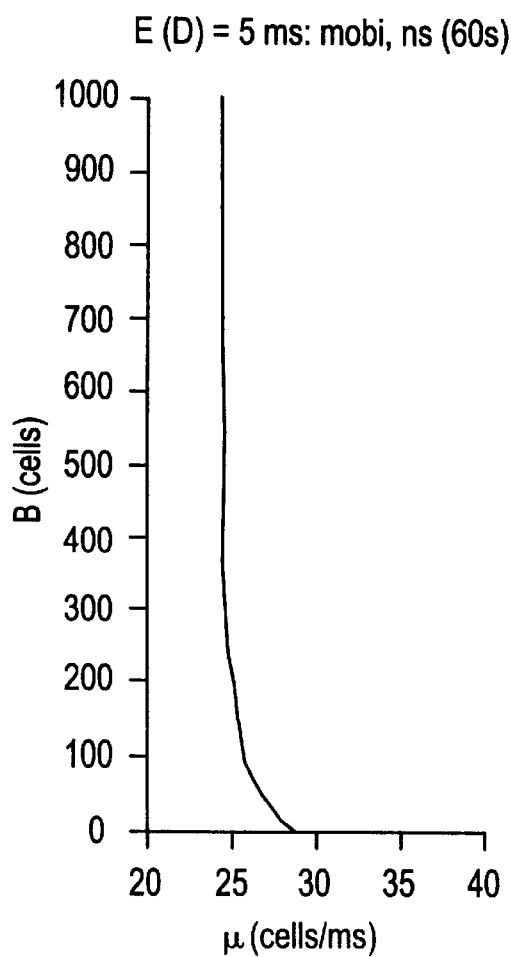
FIGS. 9a and 9b show curves of bucket size B versus rate $\mu$ for a mean shaping delay of 5 ms, and the cost function c as a function of $\mu$ for various values of the parameter k according to the present invention.
Figure 9B:
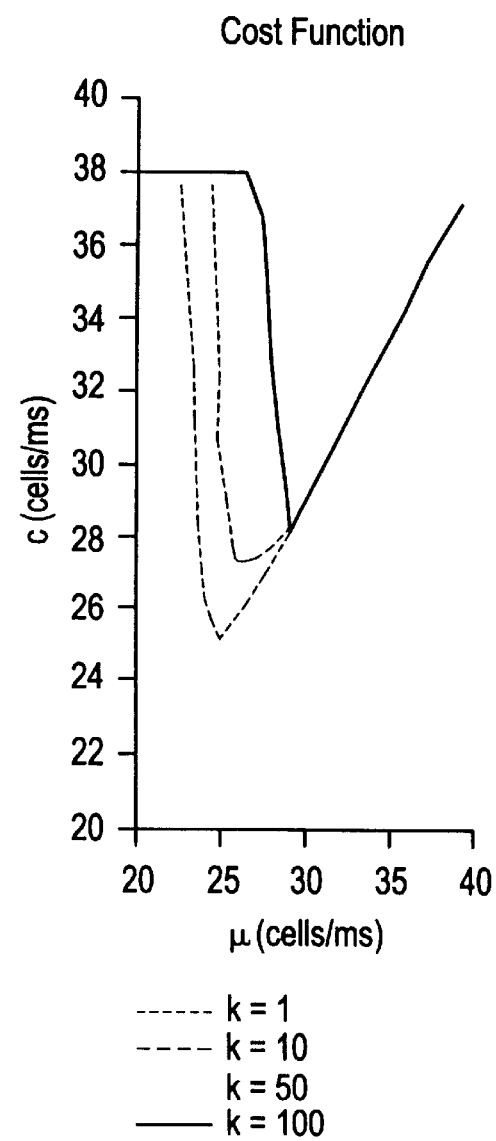

In FIGS. 9a, 9b, the expected delay E[D] is fixed at 5 ms. FIG. 9a shows the expected delay constraint curve while FIG. 9b plots the cost function curves for various values of the parameter k which is associated with the CAC function. In FIG. 9b, the multiplexer bucket size $B_{mux}$ and the steady state cell loss probability $\in_{mux}$ are set as follows: $B_{mux}=500$ (cells) and $\in mux=10^{-5}$, which are realistic values for an ATM multiplexer. These results show that for smaller values of k, any choice of the sustainable rate $\lambda_s$ in the range $(\lambda_m,\lambda_p)$ is reasonable, where $\lambda_m$ and $\lambda_p$ are the mean and peak rates, respectively. However, as k becomes larger (i.e., the source model becomes less bursty), there is a pair $(\lambda_s,B_s(\lambda_s))$ for which the required effective bandwidth is a minimum. Further, as k increases, this optimal value of $\lambda_s$ shifts towards $\lambda_m$.

In the on-line implementation, the time axis is subdivided into intervals of length T, denoted by $I(n)=((n-1)T,nT]$, $n=1,2\ldots$. Over the interval $I(n)$, estimates of the peak and mean rates, denoted $\hat{\lambda}_p(n)$ and $\hat{\lambda}_m(n)$, respectively, are obtained. During the same interval $I(n)$, the fictitious queue parameters $(a(\mu),b(\mu))$ are estimated for rates $\mu$ chosen at the beginning of the previous time interval $I(n-1)$. The rates $\mu$ are chosen to lie between the peak and mean rate estimates from the previous time interval, i.e., $\hat{\lambda}_p(n-1)$ and $\hat{\lambda}_m(n-1)$, respectively. An approximate statistical characterization, $\hat{C}_s(n)$ is obtained at the end of the interval $I(n)$. The statistical characterization $\hat{C}_s(n)$ is then mapped to a UPC parameter set $U(n)=(\lambda_p(n),\lambda_s(n),B_s(n))$. A UPC parameter set $U(n)$ is produced once every T seconds.

4.2: Estimating Peak and Mean Rates

The interval $I(n)$ is divided into M smaller sub-intervals of equal length $\tau$. Let N be the total number of cell arrivals during $I(n)$, and let $n_i$ be the number of cell arrivals in the ith sub-interval, $I=1,2,\ldots,M$. The raw mean rate estimate over $I(n)$ is given by equation (40):

$$r_m = \frac{N}{T} \qquad (40)$$

The raw peak rate estimate over $I(n)$ is defined by equation (41):

$$r_p = \max_{1\leq i\leq M} \frac{n_i}{\tau} \qquad (41)$$

For an MPEG video sequence, it is natural to take the sub-interval size $\tau$ to be the frame period of 33 ms. The peak rate, as defined above, is then just the maximum frame size during $I(n)$ divided by the frame period. This corresponds to the peak rate over $I(n)$ when 'smooth' transmission is used.

The estimates for the mean and peak rates, respectively, for the nth observation window $I(n)$ are obtained from smoothing the raw mean and peak rate estimates, $r_m$ and $r_p$ respectively, and is given by equation (42):

$$\hat{\lambda}_m(n)=r_m(n)\alpha_m(n)+(1-\alpha_m(n))\hat{\lambda}_m(n-1) \qquad (42)$$

$$\hat{\lambda}_p(n)=r_p(n)\alpha_p(n)+(1-\alpha_p(n))\hat{\lambda}_p(n-1) \qquad (43)$$

where $$\alpha_m(n) = \begin{cases} 1, & \text{if } |r_m(n)-\hat{\lambda}_m(n-1)|/\hat{\lambda}_m(n-1) > \theta_{th} \\ k_m, & \text{otherwise} \end{cases} \qquad (44)$$

$$\alpha_p(n) = \begin{cases} 1, & \text{if } |r_p(n)-\hat{\lambda}_p(n-1)|/\hat{\lambda}_p(n-1) > \theta_{th} \\ k_p, & \text{otherwise} \end{cases} \qquad (45)$$

Here, $0<\theta_{th}<1$, and $k_m, k_p$ are constants ($0<k_m, k_p<1$) which determine the degree of 'smoothing' between adjacent intervals $I(n)$. If the magnitude of the normalized difference between the raw mean rate estimate $r_m(n)$ over the current interval $I(n)$ and the previous mean rate estimate $\hat{\lambda}_m(n-1)$ exceeds the threshold value $\theta_{th}\in(0,1)$, then the past information in $\hat{\lambda}_m(n-1)$ is ignored; i.e., no smoothing is performed. Otherwise, the new estimate of the mean rate, $\hat{\lambda}_m(n)$, is taken as the weighted average (by a factor $k_m$) of the current and previous mean rate estimates. This smoothing effect is captured in the variable $\alpha_m(n)$.

Combining the current raw mean rate estimate $r_m(n)$ with the previous mean rate estimate $\hat{\lambda}_m(n-1)$ results in a new estimate $\hat{\lambda}_m(n)$ with smaller fluctuation than $r_m(n)$. This effect is desirable, particularly if the time duration T is relatively small. In that case, the raw mean rate estimate $r_m(n)$ may fluctuate about the true mean rate without actually approaching it.

On the other hand, if the source statistics are non-stationary, the past information should be discarded if a significant change in the mean rate occurs. An abrupt change in the traffic statistics (in particular, the mean rate), during an interval I(n), would be accompanied by a large relative difference (specified by $\theta_{th}$) between the current raw mean rate estimate $r_m(n)$ and the previous mean rate estimate $\hat{\lambda}_m(n-1)$. In this case, the information from the past traffic statistics should be discarded. Similar considerations apply to the estimation of the peak rate $\lambda_p$.

4.3: Determining Candidate Rates for the Traffic Characterization Method

For $n \geq 2$, the rates of the fictitious queues, also referred to as candidate sustainable rates, employed during I(n) are determined from the peak and mean rate estimates, from I(n−1), and the UPC values chosen at the end of I(n−1). Let $\lambda_s(n)$ denote the UPC sustainable rate chosen at the end of the sub-interval I(n). Let N be the total number of fictitious queues to be employed in estimating $(a(\mu), b(\mu))$ (It is assumed that N is odd). The fictitious queue rates for I(n) are denoted by $\mu_i(n)$, where i=1, ..., N. In order to use the N available queues efficiently, rate for the bank of N fictitious queues are chosen by dividing the available queues into a set of $N_c$ coarse rate queues; a set of $N_f$ fine rate queues; and a fictitious queue assigned a rate equal to the sustainable rate $\lambda_s(n-1)$ so that $N=N_c+N_f+1$.

The coarse rates for the sub-interval I(n) are assigned to be spaced between the current estimated mean rate $\hat{\lambda}_m$ and the peak rate $\hat{\lambda}_p$ according to the coarse rate resolution given by equation (46) which defined the coarse rate resolution $\Delta_c(n)$:

$$\Delta_c(n) = \left[\frac{\hat{\lambda}_p(n) - \hat{\lambda}_m(n)}{N_c + 1}\right] \quad (46)$$

The coarse rate queue rates $\mu_i(n)$ are assigned as:

$$\mu_i(n) = \hat{\lambda}_m(n) + i\Delta_c(n), \; I=1, \ldots, N_c \quad (47)$$

Let I*(n) defined by equation (48) be the index of the coarse rate closest to the sustainable rate $\lambda_s(n-1)$.

$$i^*(n) = \arg\min_{1 \leq i \leq N_c}[\mu_i(n) - \hat{\lambda}_m(n-1)] \quad (48)$$

The fine rates are assigned to be spaced symmetrically about a current sustainable rate according to the fine rate resolution given by equation (49) which defines the fine rate resolution $\Delta_f(n)$ for I(n) as:

$$\Delta_f(n) = \left[\frac{\Delta_c(n)}{(N_f/2) + (1)}\right] \quad (49)$$

Then fine rate queue rates are assigned as:

$$\mu_{j+N_c}(n) = \mu_{i^*}(n) - \left(\frac{N_f}{2} - j\right)\Delta_f(n), \; j=1, \ldots, \frac{N_f}{2} \quad (50)$$

$$\mu_{j+N_c}(n) = \mu_{i^*}(n) - \left(j - \frac{N_f}{2}\right)\Delta_f(n), \; j = \frac{N_f}{2} + 1, \ldots, N_f \quad (51)$$

The last fictitious queue is assigned the rate $\lambda_s(n-1)$, as shown in equation (52)

$$\mu_N(n) = \lambda_s(n-1) \quad (52)$$

In summary, the offering step described in section 2 comprises the step of choosing rates for the bank of N queues. This choosing step comprising the steps of:

(a) dividing the N queues into a set of $N_c$ coarse queues each having a coarse rate, $N_f$ fine queues each having a fine rate, and a queue having a rate equal to a current sustainable rate;

(b) assigning the coarse rates to be spaced between a current estimated mean rate $\hat{\lambda}_m(n)$ and a current estimated peak rate $\hat{\lambda}_p(n)$ according to the coarse rate resolution given by equation (46); and (c) assigning the fine rates to be spaced symmetrically about a current sustainable rate according to the fine rate resolution given by equation (49).

Figure 10:
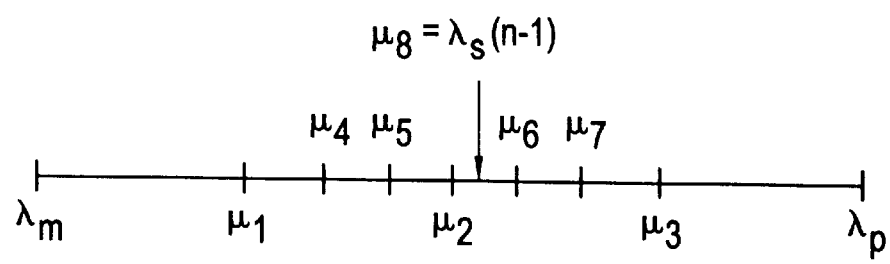
FIG. 10 shows the choice of fictitious queue rates, also referred to as candidate sustainable rates, between the estimated mean and peak rates according to the present invention.

FIG. 10 shows an example of the choice of fictitious queue rates. In this case, N=8, $N_c$=3 and $N_f$=4. The coarse rates $N_c$ are $\mu_1, \mu_2, \mu_3$ and the fine rates $N_f$ are $\mu_4, \ldots, \mu_7$.

4.4: On-Line Traffic Characterization and Mapping to UPC Values

Associated with each fictitious queue in I(n) is a counter $X_i(n)$, i=1, ..., N. Once the rates for the N fictitious queues during interval 'I' have been determined, the N queues are run in parallel. For each rate $\mu_i$, the estimates $\hat{a}(\mu_i)$ and $\hat{b}(\mu_i)$ are obtained using the procedure described earlier. The procedure requires the selection of a sequence of "arbitrary" customer arrivals. This involves generating a sequence of random positive integers, $N_j$, j=1, ..., M, where M is the number of trials. The sequence $\{N_j\}$ should have sufficiently large mean, so that the queue states seen by the chosen customer arrivals are loosely correlated. This will accelerate convergence of the sample means computed as described below. In experiments with MPEG sequences, a mean value for the sequence $\{N_j\}$ on the order of $\lambda_p \tau$ was used. The number of trials M must be such that the time required to make the observations is less than T seconds. Since the queues are run in parallel, the same sequence $\{N_j\}$ can be used for all of the queues.

At the jth "trial" for a given fictitious queue, $N_j$ customer arrivals are counted. When the $(N_j+1)$th arrival occurs, the following quantities are recorded:

$S_j$, the number of customers in service (so $S_j \in \{0, 1\}$);

$Q_j$, the number of customers in the queue; and $T_j$, the remaining service time of the customer in service (if one is in service).

The following sample means are computed:

$$\hat{a} = \frac{1}{M}\sum_{j=1}^{M} S_j, \; \hat{q} = \frac{1}{M}\sum_{j=1}^{M} Q_j, \; \hat{t}_r = \frac{1}{\hat{a}M}\sum_{k=1}^{M} T_j \quad (53)$$

Then $\hat{b}$ is computed is shown in equation (54) (see also equation (8)):

$$\hat{b} = \frac{\partial\mu}{\mu\hat{\tau}_r\hat{a}+\hat{q}} \approx \frac{\partial\mu}{(\hat{a}/2)+\hat{q}} \quad (54)$$

where $\hat{\tau}_r$ is approximated by $\frac{1}{2}\mu$.

The approximate statistical characterization at time n is defined to be:

$$\hat{C}_s(n)=[\hat{\lambda}_p(n+1); \hat{\lambda}_m(n+1); (\hat{a}(\mu_i(n)), \hat{b}(\mu_i(n))), I=1,\ldots,N] \quad (55)$$

The characterization $\hat{C}_s(n)$ is available at the end of interval I(n). Then $\hat{C}_s(n)$ is mapped to a set of UPC parameters U(n) as shown in equation (56):

$$C_s(n) \rightarrow U(n)=(\lambda_p(n),\lambda_s(n),B_s(n)) \quad (56)$$

The mapping can be decomposed as follows:

$$\hat{\lambda}_p(n+1) \rightarrow \lambda_p(n) \quad (57)$$

$$\{(\hat{a}(\mu_i(n)),\hat{b}(\mu_i(n))),i=1,\ldots N\} \rightarrow (\lambda_s(n),B_s(n)) \quad (58)$$

As noted earlier, if the difference between the estimated mean and peak rates is small, i.e., $$\hat{\lambda}_p(n+1)-\hat{\lambda}_m(n+1)<\Delta \quad (59)$$

where $\Delta$ is a rate resolution parameter, then for practical purposes, the stream should be regarded as CBR (constant bit rate) and allocated to the peak rate, as shown in equation (60):

$$\hat{\lambda}_p(n+1) \rightarrow \lambda_s(n) \quad (60)$$

There are several ways to carry out the mapping of equation (58). The case where the user is able to tolerate a relatively high degree of shaping of its cell stream is described. In particular, the user specifies a tolerable expected delay $\overline{D}$. The constraint $E[D]=\overline{D}$ determines a mean delay constraint curve in the $B \times \mu$ plane. An operating point is then chosen on the mean delay constraint curve according to a cost function. Using the cost function defined by equation (39), the operating rate index is chosen as:

$$i^*(n)=\arg\min_{1\leq I\leq N}c(\hat{\lambda}_p(n+1),\mu_i(n),B_s(\mu_i(n),\overline{D})) \quad (61)$$

where $B_s(\mu, \hat{D})$ is defined in equation (30) and gives the bucket size required to achieve a mean delay of $\overline{D}$ at a leak rate $\mu$. Then the sustainable rate is assigned as:

$$\lambda_s(n)=\mu_{i^*}(n) \quad (62)$$

As discussed earlier, an alternative to the cost function in equation (39) is to use a constraint on the probabilistic delay bound $P(D>D_{max})$, or to combine this with the cost function $c(\lambda_p, \lambda_s, B_s)$.

4.5: Numerical Examples

The procedure for selecting UPC parameters was applied to the MPEG stream called 'mobi', transmitted in non-smooth mode and with observations taken over time windows of four different lengths: 600, 60, 5, and 2 seconds, respectively. FIGS. 11a–11d show the results of this experiments on the 'mobi' MPEG sequence with observation windows of four different lengths: 600, 60, 5, and 2 seconds, respectively. The proximity of the four curves in each of FIGS. 11(a)–11(d) indicate that the inventive statistical characterization is quite robust to the length of the observation window.

Figure 11A:
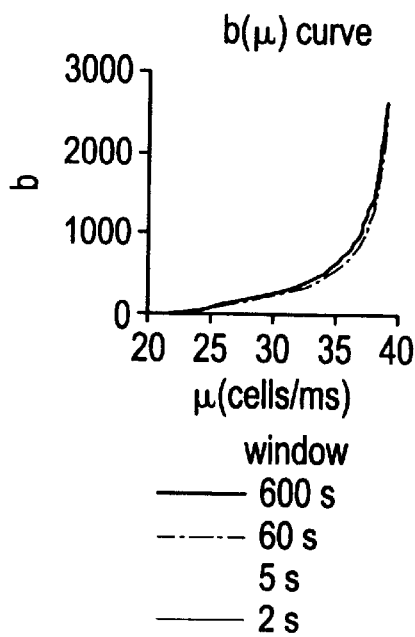
FIGS. 11a to 11d show four curves, b($\mu$), B($\mu$), P(D>25 ms), and c($\mu$) versus rate $\mu$, with different observation window lengths, used to select UPC values for the 'mobi' sequence according to the present invention.
Figure 11B:
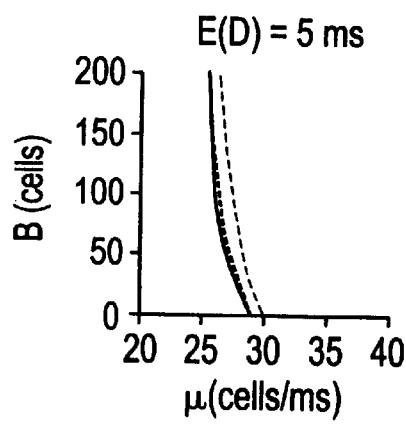
Figure 11C:
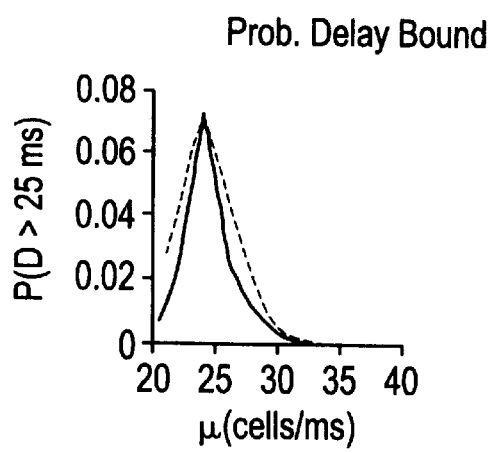
Figure 11D:
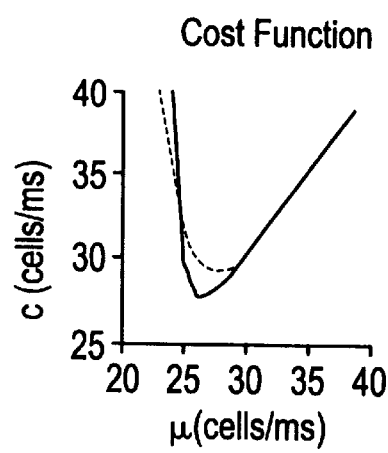

In FIG. 11a the exponent $b(\mu)$ is plotted for $\lambda_m \leq \mu < \lambda_p$. FIG. 11b shows the expected delay constraint curves for an expected delay of $\overline{D}=5$ ms. FIG. 11c shows the curves for P(D>25 ms) corresponding to the expected delay constraint curves. If the constraint P(D>25 ms)<0.05 is imposed and the choice of $\lambda_s$ is restricted to values to the right of the peak, then a value $\lambda_p^-$ is obtained. FIG. 11(d), shows the cost function with the parameter K set equal to $2 \times 10^{-3}$. Choosing the value of $\lambda_s$ (among those represented by the set of fictitious queues) which minimizes the cost function, gives a value of $\lambda_s^+$ for each curve.

TABLE 1

UPC Parameters Over Different Time Windows for the "mobi" Sequence

| Time(s) | $(\lambda_s^-, B_s(\lambda_s^-))$ | $(\lambda_s^+, B_s(\lambda_s^+))$ |
|---|---|---|
| 600 | (25, 250) | (26, 90) |
| 60 | (25, 270) | (26, 100) |
| 5 | (25, 230) | (27, 90) |
| 2 | (26, 210) | (29, 20) |

The pairs $(\lambda_s^-, B_s(\lambda_s^-))$ and $(\lambda_s^+, B_s(\lambda_s^+))$ are presented in Table 1 for the four observation windows. The parameter values appear to be fairly robust to the different window lengths. In this example, $\lambda_s^+$ lies to the right of $\lambda_s^-$ so that $\lambda_s^+$ is the rate which results in the minimum cost and also satisfies the probabilistic delay bound criterion. On the other hand, if $\lambda_s^+ < \lambda_s^-$, then the rate $\lambda_s$ should be selected. Alternatively, a trade-off between criteria of the cost function and the delay bound can be achieved by selecting $\lambda_s$, to be somewhere between the rates $\lambda_s^-$ and $\lambda_s^+$.

5: Dynamic UPC Estimation and Renegotiation 5.1: Concept of UPC Renegotiation

An ATM network providing service for variable bit rate (VBR) sources could operate more efficiently if the sources were allowed to renegotiate their resource allocations (i.e., UPC parameters) with the network. Due to the processing overhead at network switches required to re-allocate network resources for an existing call, the time between consecutive renegotiations for a source should be relatively large, e.g., at least on the order of several seconds.

UPC renegotiation would be particularly suited to sources whose traffic characteristics change significantly on a slow time-scale. For example, a scene change in a video stream may be accompanied by a dramatic change in the traffic behavior of the stream. In a real-time, interactive multimedia application, a user may request an image transfer, resulting in a transition to a period of significantly higher average bit rate lasting for several seconds. In this case, the maximum resource requirement for the call is large, but is needed only for a small portion of the call's entire duration. Static allocation to accommodate the maximum anticipated resource requirement would be extremely wasteful. Moreover, in practice, it might be difficult to anticipate, a priori, the maximum resource requirement of the source.

The inventive method observes the cell stream over a time window and determines a set of UPC parameters based on statistics gathered from the observations. In principle, the UPC parameters determined over the measurement period serve as a prediction of the appropriate UPC parameters for the rest of the cell stream. If the statistical characteristics of the cell stream are stationary and the measurement window is sufficiently long, the chosen UPC parameters set should adequately serve to represent the rest of the cell stream.

However, if the traffic characteristics change significantly over time, the chosen UPC parameters may cease to be adequate for the source for some portions of the call duration. Unless peak rate allocation for worst case traffic behavior is performed, the source will suffer cell delay or cell loss at the network access point. A reasonable solution to this problem is to allow the source to renegotiate the UPC set when a predetermined change is detected in the cell stream. This implies that the cell stream should be monitored for changes in the UPC set.

In the pipelined approach described earlier, a new UPC descriptor, U(n), is generated once every T seconds over a time-window of length T (with smoothing from earlier time-windows). However, due to the processor overhead involved in handling renegotiation at the switches within the network, a user would typically renegotiate UPC parameters less frequently than every T seconds. Generally speaking, the user should renegotiate only when there is a significant predetermined change in the UPC values.

5.2: Apparatus Implementation

Figure 13:
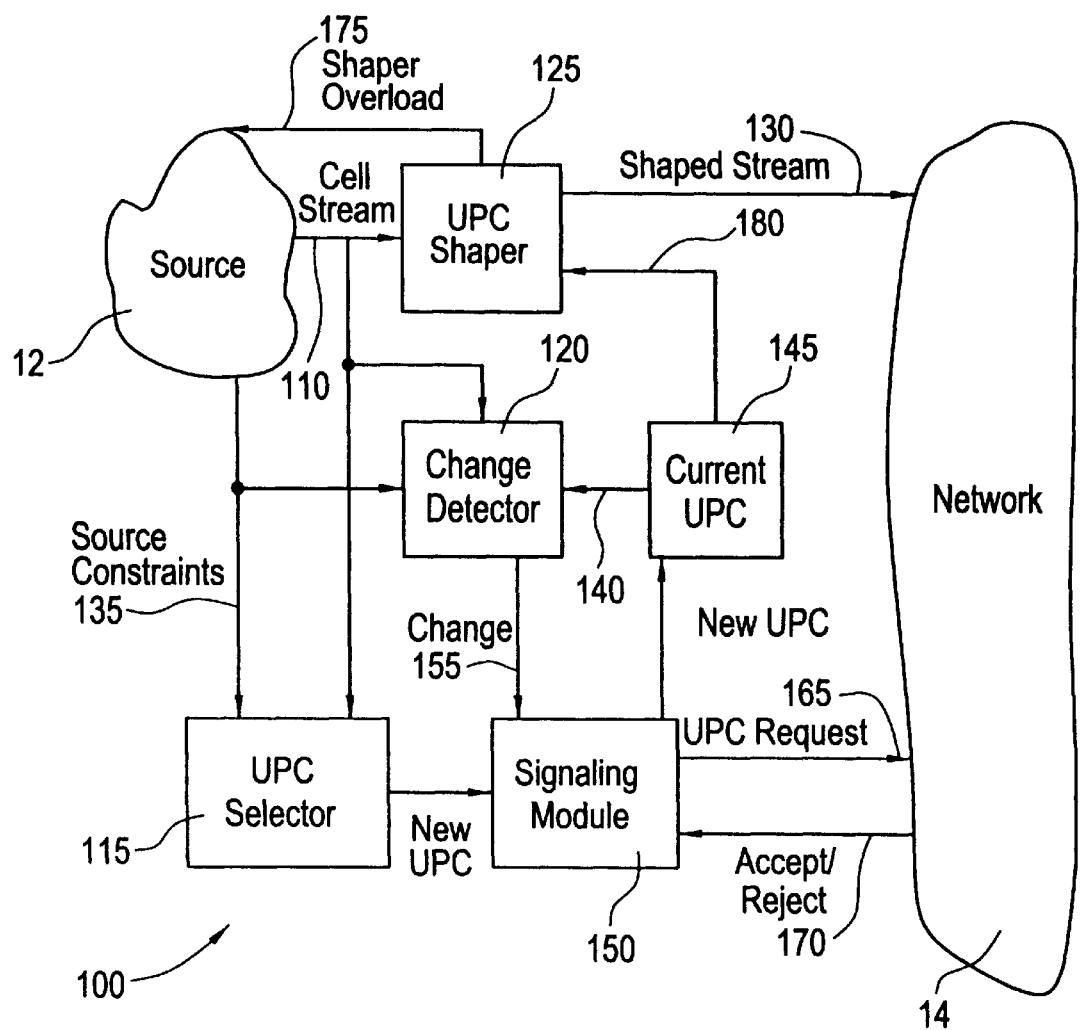
FIG. 13 shows a system block diagram for UPC value selection, change detection, and renegotiation according to the present invention.

FIG. 13 depicts a block diagram of a system implementation 100 for UPC parameter selection, change detection and renegotiation. The device 100 manages an arbitrary asynchronous transfer mode (ATM) cell stream 110 from a source 12. The source or user 12 transmits the cell stream 110 which is an input to a UPC selector 115, a change detector 120 and a UPC shaper 125.

The UPC shaper 125 implements the dual leaky bucket algorithm on the user stream 110. This shapes the cell stream 110 received from the source 12 in accordance with the UPC parameters or values received on line 180 from a current UPC module 145 as described below. After shaping the cell stream 110, the UPC shaper 125 outputs shaped stream data 130 to the network 14. The shaped cell stream or data 130 conforms to the UPC parameters.

The UPC selector 115 takes the user cell stream 110 and user shaping constraints 135 as inputs and implements the algorithm described earlier for determining a sequence of UPC parameters. Note that the UPC selector 115 generates a new UPC parameter set once every T seconds.

In particular, the UPC selector 115 characterizes the cell stream 110 statistically over an observation interval T. The UPC selector 115 also maps the statistically characterized cell stream to a dual leaky bucket usage parameter control (UPC) values once every observation interval T, in response to observations of the cell stream 110 and the source shaping constraints 135 received from the source 12.

The change detector 120 receives the cell stream 110. The change detector 120 determines whether or not there has been a significant predetermined change or violation of the user constraints 135, received from the source 12, with the current UPC parameters 140 received from the current UPC module 145.

A decision on whether or not to retain the current UPC parameters is made by the change detector 120 once every T seconds and is provided to a signaling module 150 via a change signal 155. In case a change is detected, the signaling module 150 updates the current UPC module 145 with a new or the latest UPC set 160 produced by the UPC selector 115. The signaling module 150 also issues a UPC renegotiation request 165 to the network 14. Typically, a decrease in network resources, such as bandwidth requirement, is granted by the network. The decreased network resources reduces the user's cost of transmitting the cell stream 12.

The network 14 determines whether or not the renegotiation request 165 can be accommodated with the current available resources. The algorithm employed by the network 14 to make this decision is beyond the scope of the present invention. It is assumed that the network 14 handles call admission and renegotiation requests in such a way that the probability of rejection is acceptably low.

Instead of updating the current UPC module 145 with the latest UPC parameters upon receipt of the change signal 155 that indicates an update of the UPC parameters is required, the signaling module 150 first waits to receive a signal from the network on an accept/reject line 170. When an accept signal is received from the network 14 on the accept/reject line 170, the signaling module 150 then provides updated UPC values received from the UPC selector 115 to the current UPC module 145.

In case a UPC request 165 (for an increase in UPC values) is rejected by the network 14, as indicated by an accept/reject signal 170 from the network 14 to the signaling module 150, a buffer (not shown) contained in the UPC shaper 125 may approach an overload condition. In the event of shaper overload, an overload signal 175 is fed back to the source 12. The source 12 may then throttle its transmitted stream 110 until the shaper overload condition subsides or else suffer cell loss at the UPC shaper 125. Some types of sources 12, such as video or still image transmission, may increase a quantization parameter to reduce the output cell stream 110 during periods in which a request 165 for an increase in UPC values is rejected by the network 14.

5.3: Change Detection

Next, the algorithm underlying the change detector 120 is described. It is assumed that the initial set of UPC parameters, $\tilde{U}$, which is initially provided by the UPC selector 115 and stored in the current UPC module 145, is assigned after an interval of 2T seconds, at the end of I(2). The parameter set $\tilde{U}$ is then negotiated with the network 14. Meanwhile, the UPC shaper 125 shapes the cell stream 110 according to the descriptor $\tilde{U}$ until a change in traffic characteristics is detected as indicated by a change in the UPC parameters received on line 180 from the current UPC module 145. From the user's point of view, such a change is signaled by a change in the proportion of cells in violation (i.e., nonconforming cells) of $\tilde{U}$.

The average cell delay through the sustainable rate leaky bucket can be estimated from observations of the queue at 'arbitrary' cell arrivals instances. Specifically, for M 'trials' taken over an observation window of length T, the mean cell delay $\hat{d}$ can be estimated as:

$$\hat{d} = \frac{1}{M} \sum_{i=1}^{M} h_s(Q_i) \left[ \frac{Q_i - \tilde{B}_s}{\tilde{\lambda}_s} + T_i \right] \quad (63)$$

where $h_s(t) = (t - \tilde{B}_s)$ with u(t) being the unit step function. As before, $Q_i$ and $T_i$ are, respectively, the number in the queue and the remaining service time of the customer in service (if any) seen by the arbitrary arrival. Under moderate-to-heavy utilization, $T_i$ is approximated by $\frac{1}{2}\lambda_s$. Recall that the user 12 specifies its tolerable mean cell delay $\overline{D}$ as input 135 to the module or UPC selector 115 which determines the UPC parameters. In order to ensure that the target delay is achieved, the UPC selector 115 actually uses a smaller value $D^* < \overline{D}$ in determining the UPC parameters. It is assumed that a peak rate estimate $\hat{\lambda}_p$ is computed once every T seconds, as described earlier in the pipelined traffic measurement. Over the same time interval, the mean delay estimate $\hat{d}$ is computed using the current UPC descriptor $\hat{U}$. The change in UPC parameters is detected at the end of the T second interval under one of the following two conditions:

1. $\hat{d} > D^* + \delta_h$ or $\hat{d} < D^* + \delta_l$

2. $\hat{\lambda}_p > \lambda_p + r_h$ or $\hat{\lambda}_p < \lambda_p - r_l$

Here, $\delta_h$, $\delta_l > 0$ are thresholds on the target mean delay and $r_h$, $r_l > 0$ are thresholds on the peak rate. The measurement of $\hat{\lambda}_p$ over the intervals $I_1(n)$, n=1,2, . . . , can be used for the purposes of change detection. Over the same intervals $I_1(n)$, the mean cell delay estimate, $\hat{d}(n)$, for the current UPC descriptor $\tilde{U}(n)$ is computed.

Next, define a sequence H(n), n=1, 2, . . . , is defined, where H(n)=0, n=1,2, and for n≥3, $$H(n) = \begin{cases} 1, & \text{if threshold conditions are met.} \\ 0, & \text{otherwise} \end{cases} \quad (64)$$

Define a sequence $\{\tilde{U}(n)\}$ of the UPC descriptors, where $\tilde{U}(n)$ is the descriptor used over the interval I(n) (n≥3):

$$\tilde{U}(n) = \begin{cases} U(n-1), & \text{if } H(n) = 1 \\ \tilde{U}(n-1), & \text{otherwise} \end{cases} \quad (65)$$

A UPC renegotiation using the current set $\tilde{U}(n)$ is attempted whenever H(n)=1.

In summary, the detecting step described in section 1 and the present section 5.4, comprises the steps of:

estimating a mean cell delay, $\hat{d}$, for a leaky bucket parameterized by the sustainable rate $\lambda_s$ and the sustainable bucket size $B_s$;

estimating the peak rate $\lambda_p$ to obtain an estimated peak rate $\hat{\lambda}_p$;

signaling a change when the mean cell delay $\hat{d}$ falls outside a range of values in a neighborhood of a user-specified tolerable mean delay $\overline{D}$, or when the estimated peak rate $\hat{\lambda}_p$ falls outside a range of values in a neighborhood of the peak rate $\lambda_p$. The leaky bucket is a sustainable rate leaky bucket of a dual leaky bucket having the peak and sustainable rate leaky buckets 55, 60 shown in FIG. 3.

The change detector 120 estimates the peak rate $\hat{\lambda}_p$ and the mean cell delay, $\hat{d}$, for a sustainable rate leaky bucket parameterized by current negotiated UPC values $(\lambda_s, B_s)$, where $\lambda_s$ is the current sustainable rate and $B_s$ is the current sustainable bucket size. The change detector 120 outputs the change signal 155 that indicates update of the UPC values is required when the mean cell delay $\hat{d}$ falls outside a range of values in a neighborhood of a user-specified tolerable mean delay $\overline{D}$, or when the peak rate $\hat{\lambda}_p$ falls outside a range of values in a neighborhood of a current negotiated peak rate $\lambda_p$.

5.4: Example

To demonstrate the inventive method for combined dynamic UPC selection and renegotiation, two different MPEG sequences called "mobi" and "flower" were interleaved such that the resulting sequence experiences a significant change in traffic characteristics once every ten seconds.

The interleaved sequence comprises the first ten seconds of "mobi" followed by the first ten seconds of "flower" followed by the next ten seconds of "mobi", etc. The inventive method was applied to the interleaved sequence with parameters specified as follows:

mean shaping delay [ms]: $\overline{D}$=5 delay bound: $D_{max}$=25 $\in_D$=0.05 delay thresholds [ms]: $\delta_h$=25, $\delta_h$=2 peak rate thresholds [cells/ms]: $r_h$=3, $r_l$=5

Figure 14A:
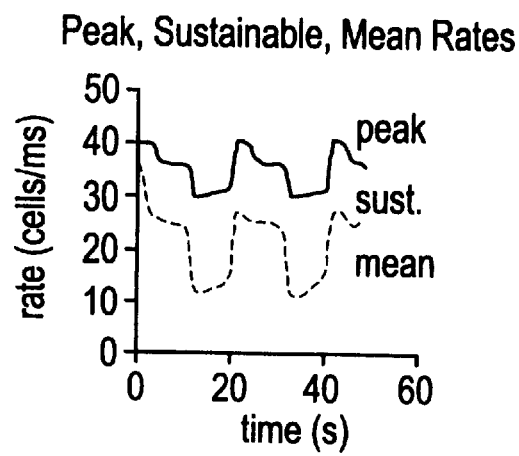
FIGS. 14a and 14b show two curves of the estimated UPC values with an observation window length 1.25 seconds according to the present invention.
Figure 14B:
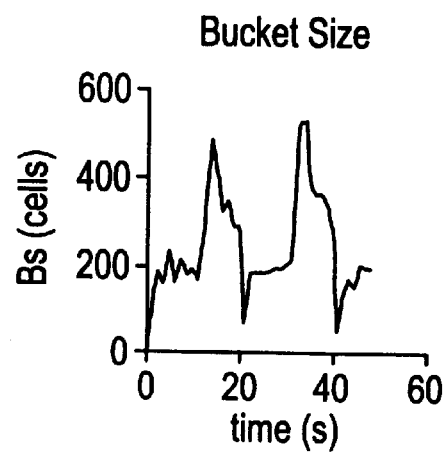
Figure 14C:
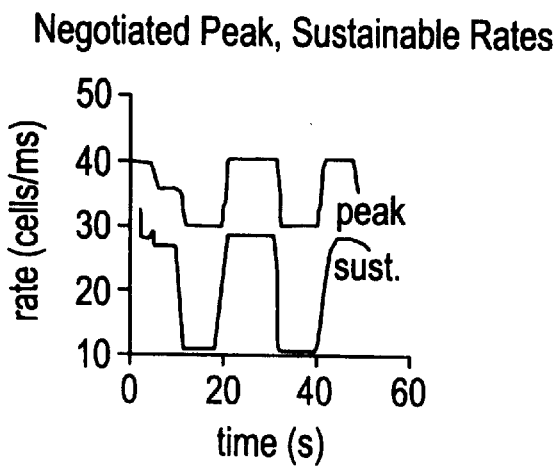
FIGS. 14c and 14d show two curves of the negotiated UPC values with an observation window length 1.25 seconds according to the present invention.
Figure 14D:
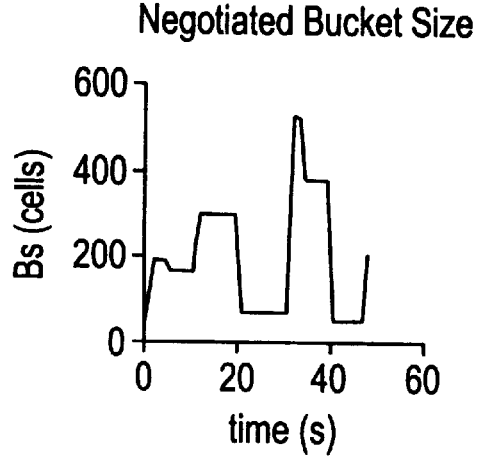
Figure 15A:
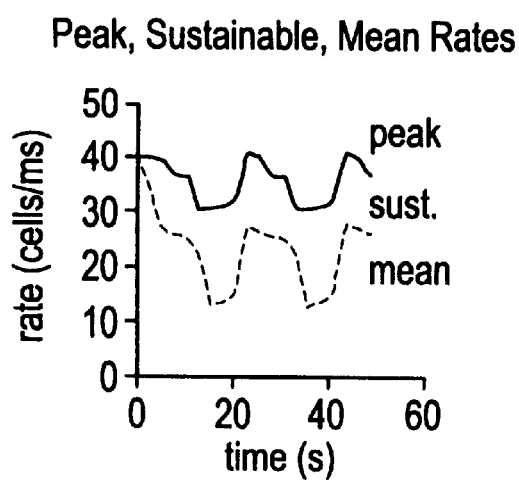
FIGS. 15a and 15b show two curves of the estimated UPC values with an observation window length 2.5 seconds according to the present invention.
Figure 15B:
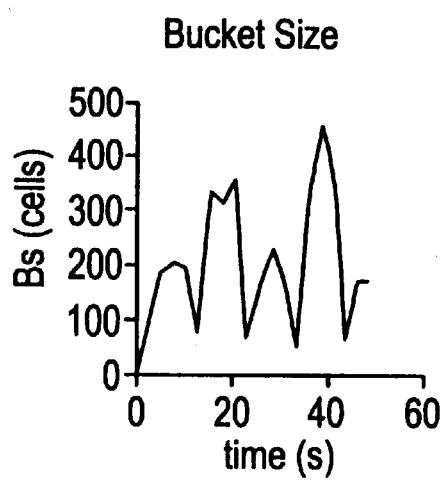
Figure 15C:
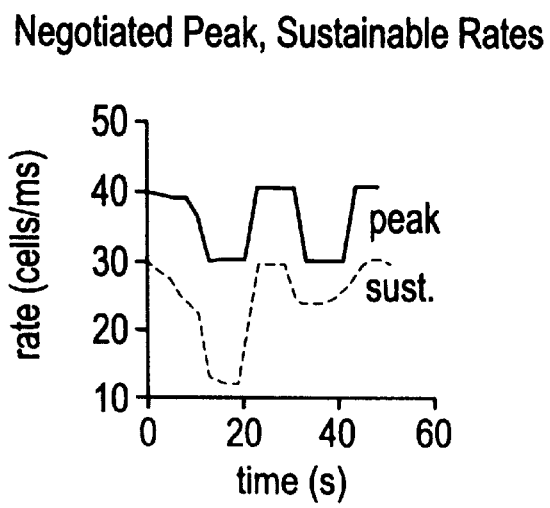
FIGS. 15c and 15d show two curves of the negotiated UPC values with an observation window length 2.5 seconds according to the present invention.
Figure 15D:
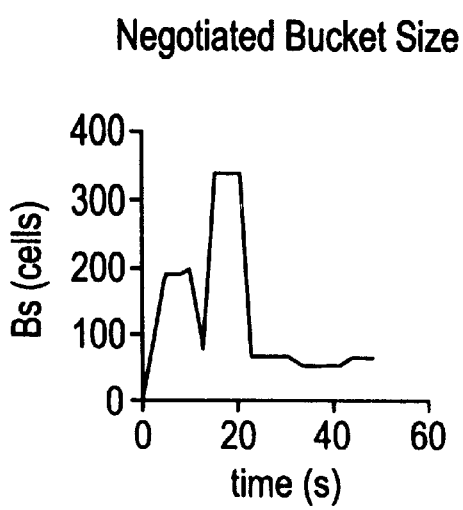

FIGS. 14a–14d display the results over a time period of 50 seconds (s) and with an observation window having a length of T=1.25 s. FIG. 14a plots the sequences of the estimated peak, sustainable and mean rates, $\{\hat{\lambda}_p(n)\}$, $\{\hat{\lambda}_s(n)\}$, and $\{\hat{\lambda}_m(n)\}$, respectively. Note that the sustainable rate sequence always lies between the peak and mean rate sequences. FIG. 14b plots the sequence of estimated bucket sizes $\{\hat{B}_s(n)\}$ corresponding to the sustainable rate sequence for the given delay requirements and cost function. FIG. 14c shows the sequences of negotiated peak and sustainable rates, $\{\lambda_p(n)\}$, $\{\lambda_s(n)\}$, respectively. FIG. 14d plots the sequence of negotiated bucket sizes, $\{\tilde{B}_s,(n)\}$. Observe that the sequence of negotiated UPC parameters has the desirable behavior of remaining approximately constant over the ten second windows corresponding to either the "mobi" or "flower" sequences. For comparison purposes, FIGS. 15a–15d display the results with the same parameters as in FIGS. 14a–14d, except that the observation window length is set to T=2.5 s. Thus, through an appropriate change detection function, the frequency of renegotiation can be minimized without affecting the Quality-of-Service (QoS).

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

What is claimed is:

1. A method of characterizing an arbitrary asynchronous transfer mode (ATM) traffic stream in real-time comprising the steps of:

characterizing the traffic stream statistically over an observation interval T;

mapping the statistically characterized traffic stream to usage parameter control (UPC) values of a dual leaky bucket which minimize a cost function subject to predetermined constraints of a user, said dual leaky bucket including a peak rate leaky bucket and a sustainable rate leaky bucket, and said UPC values including a peak rate $\lambda_p$, a sustainable rate $\lambda_s$, and a sustainable bucket size $B_s$;

detecting a predetermined change in the traffic stream; and renegotiating the UPC values with a network when said predetermined change is detected.

2. The method of claim 1, wherein the characterizing step further comprise the steps of:

offering the traffic stream to a bank of N constant service rate queues with spaced rates that are spaced between an estimated mean rate $\hat{\lambda}_m$ and an estimated peak rate $\hat{\lambda}_p$, said spaced rates being candidates for sustainable rates; and approximating a tail waiting time distribution for each of said queues by an exponential equation having a form of $$P(W>t)=a(\mu)e^{-b(\mu)t}, t \geq 0,$$

wherein $\mu$ is a constant service rate and one of the candidate sustainable rates.

3. The method of claim 2, wherein the offering step comprises the step of choosing rates for the bank of N queues, said choosing step comprising the steps of:

dividing the N queues into a set of $N_c$ coarse queues each having a coarse rate, $N_f$ fine queues each having a fine rate, and a queue having a rate equal to a current sustainable rate;

assigning the coarse rates to be spaced between a current estimated mean rate $\hat{\lambda}_m(n)$ and a current estimated peak rate $\hat{\lambda}_p(n)$ according to a coarse rate resolution given by $$\Delta_c(n) = \left\lceil \frac{\hat{\lambda}_p(n) - \hat{\lambda}_m(n)}{N_c + 1} \right\rceil;\text{ and}$$

assigning the fine rates to be spaced symmetrically about a current sustainable rate according to the fine rate resolution given by $$\Delta_f(n) = \frac{\Delta_c(n)}{(N_f/2) + (1)}.$$

4. The method of claim 2 further comprising the step of estimating the parameters $a(\mu)$ and $b(\mu)$ in the tail waiting time distribution for each queue of constant service rate $\mu$, said estimating step comprising the steps of:
estimating an average remaining service time, $T_r(\mu)$, for a customer in service as seen by an arriving customer conditional on there being a customer in service;
estimating a probability that an arbitrary arriving customer sees a customer in service, and setting $a(\mu)$ equal to said probability;
estimating $q(\mu)$, which is an expected number of customers in a queue seen by the arbitrary arriving customer; and
computing $b(\mu)$ according to $$b(\mu) = \frac{a(\mu)\mu}{\mu T_r(\mu) a(\mu) + q\mu}.$$

5. The method of claim 2 further comprising computing a smallest sustainable bucket size $B_s(\mu)$ for a predetermined sustainable rate $\mu$, such that a sustainable rate leaky bucket with parameters $(\mu, B_s(\mu))$ satisfies a constraint on one of a violation probability and a mean shaping delay according to $$B_s(\mu) = \frac{\mu}{b(\mu)} \log\left(\frac{a(\mu)}{\epsilon}\right)$$

when the violation probability is constrained to be no larger than a predetermined violation probability $\epsilon$, and according to $$B_s(\mu) = \frac{\mu}{b(\mu)} \log\left(\frac{a(\mu)}{b(\mu)\overline{D}}\right)$$

when the mean shaping delay is constrained to be no more than a predetermined mean shaping delay $\overline{D}$.

6. The method of claim 1 further comprising computing an approximate required resource as a cost function, $c(\lambda_p, \lambda_s, B_s)$ of a predetermined UPC set $(\lambda_p, \lambda_s, B_s)$ according to $$c(\lambda_p, \lambda_s, B_s) = \min\left(\lambda_p, \lambda_s + K \frac{\lambda_s(\lambda_p - \lambda_s)B_s}{\lambda_p}\right)$$

where K is a parameter used to match approximately a connection admission control function of the network.

7. The method of claim 2, wherein the mapping step comprises the steps of:
computing, for each of the candidate sustainable rates $\mu$ used in the characterizing step, a corresponding value $B_s(\mu)$ for a smallest sustainable bucket size such that a sustainable rate leaky bucket with parameters $(\mu, B_s(\mu))$ satisfies a constraint which bounds one of a cell violation probability and a mean shaping delay;
computing, for each of the candidate sustainable rates $\mu$ used in the characterizing step, a corresponding value $c(\lambda_p, \mu, B_s(\mu))$ of the cost function that determines cost to the network;
selecting, among the candidate sustainable rates, an optimal sustainable rate $\mu = \lambda^*_s$ that minimizes the cost function $c(\lambda_p, \mu, B_s(\mu))$; and
choosing new UPC values that include the peak rate $\lambda_p$, the optimal sustainable rate $\lambda_s^*$, and the sustainable bucket size $B_s(\lambda_s^*)$.

8. The method of claim 1, wherein the detecting step comprises the steps of:
estimating a mean cell delay, $\hat{d}$, for a leaky bucket parameterized by the sustainable rate $\lambda_s$ and the sustainable bucket size $B_s$;
estimating the peak rate $\mu_p$ to obtain an estimated peak rate $\hat{\lambda}_p$;
signaling a change when the mean cell delay $\hat{d}$ falls outside a range of values in a neighborhood of a user-specified tolerable mean delay $\overline{D}$, or when the estimated peak rate $\hat{\lambda}_p$ falls outside a range of values in a neighborhood of the peak rate $\lambda_p$.

9. The method of claim 8, wherein said leaky bucket is a sustainable rate leaky bucket of a dual leaky bucket that includes a peak rate leaky bucket connected in series to said sustainable rate leaky bucket.

10. A device for managing an arbitrary asynchronous transfer mode (ATM) cell stream from a source comprising:
a usage parameter control selector which characterizes the cell stream statistically over an observation interval T and maps the statistical characterization to dual leaky bucket usage parameter control (UPC) values once every observation interval T, in response to observations of the cell stream and source shaping constraints received from the source;
a usage parameter control shaper that shapes, in accordance with said UPC values, the cell stream received from the source and outputs shaped stream data; and
a change detector which receives the cell stream, source shaping constraints, and the UPC values, and outputs a change signal indicative of whether an update of the UPC values stored in a memory is required.

11. The device of claim 10 further comprising a current usage parameter control module which stores the UPC values.

12. The device of claim 11 further comprising a signaling module which receives the UPC values and the change signal, and provides updated UPC values received from the usage parameter control selector to the memory when the change signal indicates said update is required.

13. The device of claim 11 further comprising a signaling module which receives the UPC values and the change signal, and outputs a UPC renegotiation request to the network, said signaling module providing said update of UPC values to the memory when said signaling module receives an accept signal from the network indicating acceptance of said UPC renegotiation request.

14. The device of claim 11, wherein the change detector estimates a peak rate $\hat{\lambda}_p$ and a mean cell delay, $\hat{d}$, for a sustainable rate leaky bucket parameterized by current negotiated UPC values $(\lambda_s, B_s)$; and wherein the change detector outputs a change signal that indicates update of the UPC values is required when the mean cell delay $\hat{d}$ falls outside a range of values in a neighborhood of a user-specified tolerable mean delay $\overline{D}$, or when the peak rate $\hat{\lambda}_p$ falls outside a range of values in a neighborhood of a current negotiated peak rate $\lambda_p$.

15. A device for managing an arbitrary asynchronous transfer mode (ATM) cell stream from a source comprising:

a usage parameter control selector which characterizes the cell stream statistically over an observation interval T and maps the statistical characterization to dual leaky bucket usage parameter control (UPC) values once every observation interval T, in response to observations of the cell stream and source shaping constraints received from the source;

a usage parameter control shaper that shapes, in accordance with said UPC values, the cell stream received from the source and outputs shaped stream data; and a signaling module which receives said UPC values from said usage parameter control selector and outputs a UPC renegotiation request to the network, said usage parameter control shaper providing a shaper overload signal to said source when an accept/reject signal from the network provided in response to the UPC renegotiation request indicates a rejection of said renegotiation request.

16. The device of claim 11, wherein said usage parameter control shaper provides a shaper overload signal to said source when a buffer of said shaper overloads.

17. The device of claim 16, wherein said source reduces said cell stream data in response to said shaper overload signal.

18. The device of claim 15 further comprising a current usage parameter control module which stores the UPC values.

19. The device of claim 15, wherein said usage parameter control shaper provides a shaper overload signal to said source when a buffer of said shaper overloads.

20. The device of claim 19, wherein said source reduces said cell stream data in response to said shaper overload signal.

* * * * *